United States Patent [19]

Morrison et al.

[11] Patent Number: 4,709,332

[45] Date of Patent: Nov. 24, 1987

[54] HIGH SPEED IMAGE DATA PROCESSING

[75] Inventors: John Morrison, Dix Hills; Eric J. Siskind, Lattingtown, both of N.Y.; Meryll M. Frost, Jr., Baltimore, Md.

[73] Assignee: North Shore University Hospital, Manhassett, N.Y.

[21] Appl. No.: 659,071

[22] Filed: Oct. 5, 1984

[51] Int. Cl.[4] .................. G06F 15/28; G06F 15/44; G06G 7/48

[52] U.S. Cl. ..................................... 364/414; 378/99; 358/111

[58] Field of Search .................. 364/414; 382/6; 378/901, 99; 358/111

[56] References Cited

U.S. PATENT DOCUMENTS

| 4,449,195 | 5/1984 | Andrews et al. | 364/900 |
| 4,559,557 | 12/1985 | Keyes et al. | 378/99 |
| 4,590,518 | 5/1986 | Fenster et al. | 378/99 |

OTHER PUBLICATIONS

Radiology, vol. 139, May, 1981, pp. 273-276, Charles A. Mistretta, Andrew B. Crummy, and Charles M. Strothers, "Digital Angiography: a Perspective".
Science, vol. 214, No. 13, Nov., 1981, pp. 761-765, Charles A. Mistretta and Andrew B. Crummy, "Diagnosis of Cardiovascular Disease by Digital Subtraction Angiography".
IEEE Transaction on Nuclear Science, vol. NS-30, No. 5, Oct. 1983, pp. 3775-3778, Eric J. Siskind, L. Ong, M. Srinivasan, M. Frost, P. Reiser, J. Morrison, "High Bandwidth FASTBUS Based Data Acquisition System for Imaging Coronary Arteries".

Primary Examiner—E. A. Goldberg
Assistant Examiner—Lincoln Donovan
Attorney, Agent, or Firm—Brumbaugh, Graves, Donohue & Raymond

[57] ABSTRACT

A minimally invasive technique for obtaining X-ray images of the anatomical vasculature of a living patient includes intravenously injecting the patient with an X-ray contrast medium, obtaining video X-ray images of the vasculature in a region of the patient's body at a high frame rate to avoid significant blurring of the images caused by tissue and bone movement in the region, converting the video X-ray images to digital image data, transferring the image data in real time to a bulk memory by way of a FASTBUS system, transferring the image data from the bulk memory to a computer via the FASTBUS system at a rate commensurate with the capacity of the computer to receive such data, and utilizing the computer to effect image enhancement processing of the data for subsequent viewing.

17 Claims, 15 Drawing Figures

Microfiche Appendix Included
(358 Microfiche, 8 Pages)

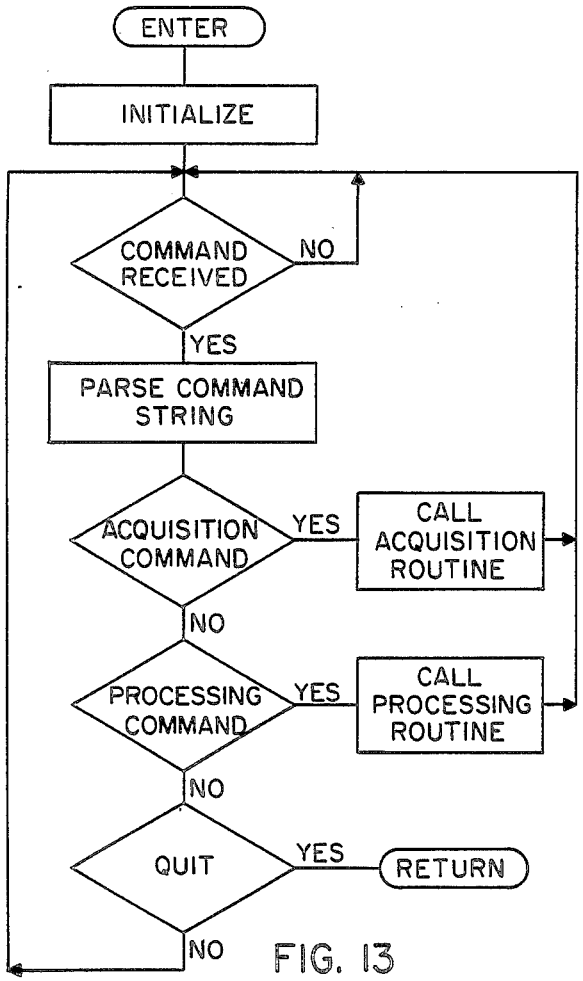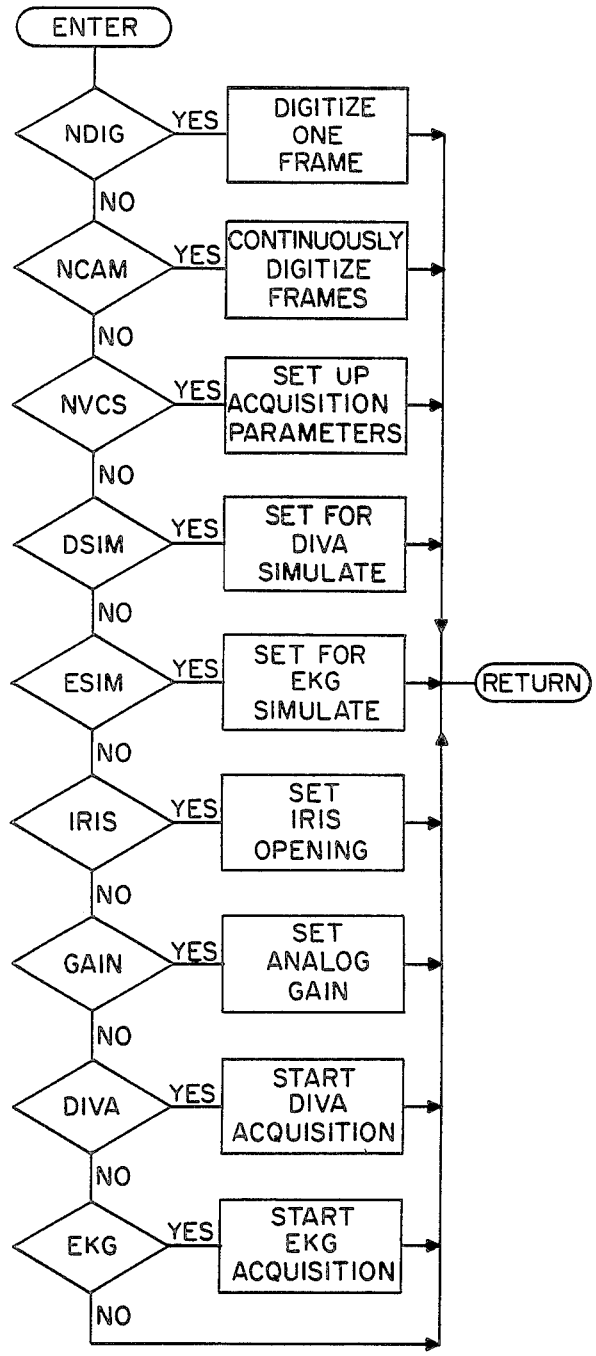

HIGH SPEED IMAGE DATA PROCESSING

A Microfiche Appendix containing 358 frames on 8 cards is included in the specification and is hereafter referred to as Appendix I.

BACKGROUND OF THE INVENTION

This invention relates generally to X-ray imaging, and more particularly to a high frame-rate X-ray imaging system incorporating high speed image data acquisition and processing means enabling the X-ray imaging of anatomical vasculature in living patients in a highly effective and safe manner.

In connection with the study of spontaneous reperfusion during acute myocardial infarction, and for the purpose of determining a patient's condition during acute myocardial infarction, it is desirable to obtain images of the patient's coronary arterieis by X-ray techniques. The usual technique for obtaining such images is to introduce an appropriate X-ray opaque dye (contrast material) at relatively high concentrations into the heart arteries during direct X-ray examination. Because of the high concentration of contrast material required by this technique to obtain suitable images, it is necessary to introduce the contrast material directly to the heart arteries by coronary catheterization, a highly invasive procedure involving the insertion of a catheter tube through the patient's arteries. While effective, this procedure is generally undesirable because of the risks that it imposes on the patient.

It is also feasible to perform arterial X-ray imaging with a relatively low concentration of X-ray contrast material introduced by intravenous injection and using known digital computer image enhancement techniques, such as digital subtraction, to extract suitable arterial images. However, such techniques are ineffective for the detailed examination of the blood flow in the heart because the image data acquisition and processing systems heretofore available limit the maximum imaging rate to approximately 1.5 images per second. This rate is far too low in relation to the heart motion and other normally occurring tissue and bone movement to permit the acquisition of cardiac arterial images having sufficiently high temporal and spatial resolution to enable the precise determination of, for example, atherosclerotic plaque mass, regional myocardial X-ray contrast arrival time (perfusion), or global and regional systolic and diastolic ventricular function. Similar problems exist in the X-ray imaging of anatomical vasculature in other regions of a patient's body where the existence of motion artifact imposes limitations on the temporal and spatial resolution obtainable and causes misregistration when digital processing techniques are used to enhance the images.

Therefore, a need clearly exists for a high speed image data acquisition and processing system suitable for minimally invasive X-ray imaging of anatomical vasculature of living patients.

BRIEF SUMMARY OF THE INVENTION

Briefly, the foregoing and other objects of the invention are attained according to the invention by converting analog image signals from an imaging system operating at a high image frame rate to digital data, assembling the data from the imaging system into digital data blocks, reforming the data blocks into appropriate data words, storing the data words in a bulk memory at a rate corresponding to at least the image frame rate, transferring data from the bulk memory to a computer on demand at a rate commensurate with its capacity to receive such data, and utilizing the computer to effect image enhancement processing of the data for subsequent viewing by a display system.

Imaging data acquisition systems according to the invention may be configured to process imaging signals from multiple television (TV) cameras, as well as imaging signals produced at frame rates or with density picture elements (pixels) substantially greater than has previously been possible.

BRIEF DESCRIPTION OF THE DRAWING

The invention may be better understood from the following detailed description taken in conjunction with the accompanying drawings, in which:

FIG. 11 is a flow diagram of the ROOT program of the MC68000 microprocessor;

FIG. 12 is a flow diagram illustrating the MAPPER subroutine of the ROOT program;

FIG. 13 is a flow diagram illustrating the MAIN subroutine of the ROOT program; and FIG. 14 is a flow diagram illustrating the CAMERA subroutine of the ROOT program.

DETAILED DESCRIPTION

Figure 1:
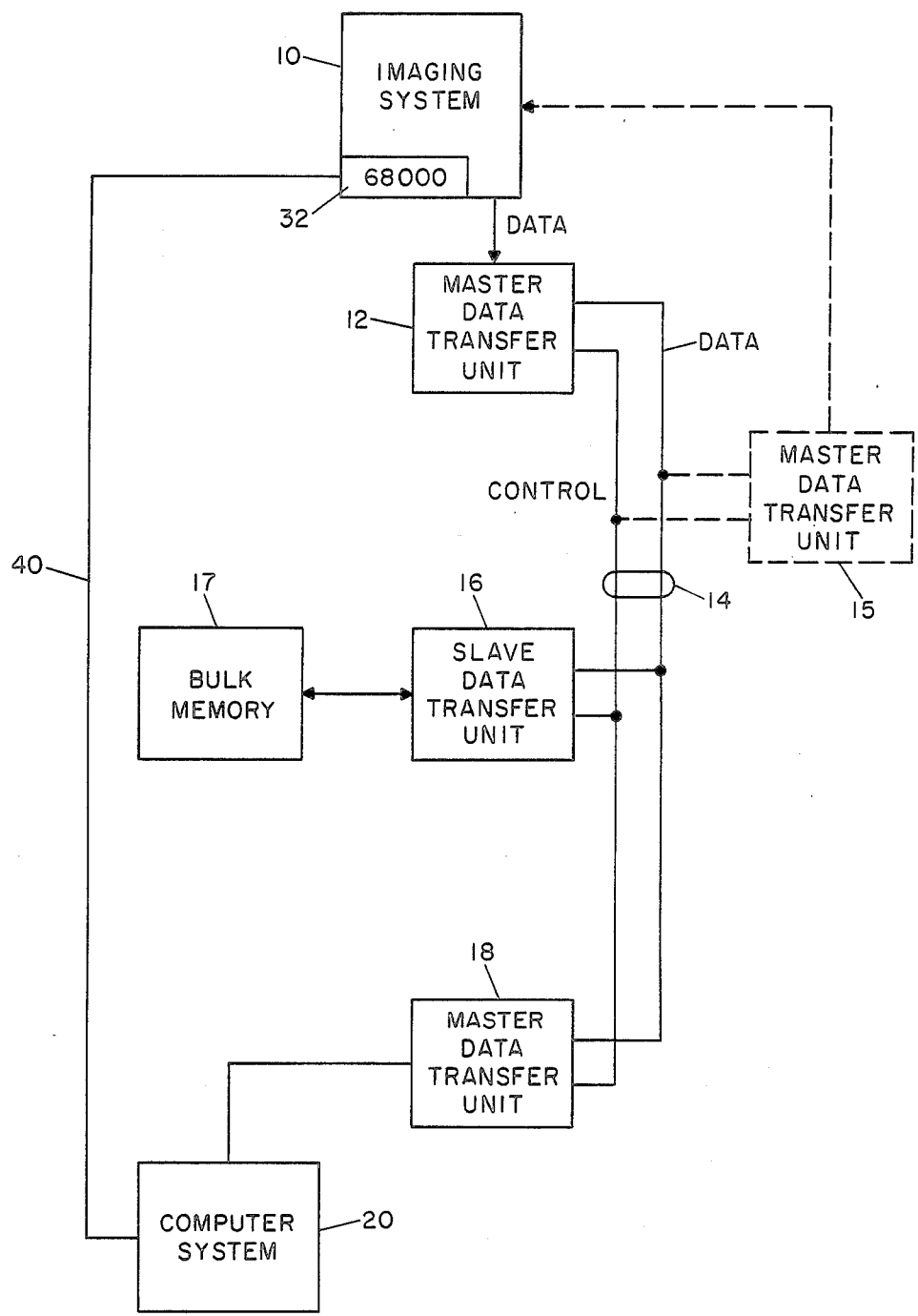
FIG. 1 is a simplified schematic diagram of a typical image data acquisition and processing system constructed according to the present invention.

FIG. 1 is a simplified block diagram of an image data acquisition and processing system in accordance with the present invention. The system of FIG. 1 operates to acquire real-time, high-speed digital image data and provide that data to a computer system 20, on demand, at a rate commensurate with its capacity to receive such data. Following its transfer to the computer system 20, the image data undergoes processing for image enhancement.

An application for the image data acquisition and processing system of the present invention is in acquiring high speed digital data corresponding to video images taken during high image frame-rate X-ray examination of a patient and making that data available on demand to the computer system 20, which can perform an image enhancement process, such as digital subtraction, and develop enhanced and detailed images of the portions of the patient that a physician wishes to examine, as will be further described.

In the system shown in FIG. 1, imaging data is generated in an X-ray imaging system 10, which in the particular embodiment of FIG. 1, operates under the control of a microprocessor 32, such as a Motorola, Inc. MC68000 microprocessor or equivalent. The microprocessor 32 is provided with a control program stored on a disk system (not shown in FIG. 1) coupled to the microprocessor including operating instructions which may vary the mode of operation of the imaging system 10, as will be described.

In operation, the imaging system 10 provides data and timing signals to a first master data transfer unit 12. The first master data transfer unit 12 assembles the data from the imaging system into appropriate digital data blocks and generates further control signals to effectuate a block transfer of the data at high speed to a slave data transfer unit 16 via a data transfer bus 14. The slave data transfer unit 16 receives the transferred blocks of data, reforms the data into appropriate data words, and effectuates the storage of the data in a bulk memory 17.

The operations described thus far with respect to FIG. 1 can accomodate the high-speed acquisition of digital data which is taken from the imaging system 10 by the first master data transfer unit 12, transmitted by the data transfer bus 14 to the slave data transfer unit 16, and then stored in the bulk memory 17. Since the imaging system 10 may acquire data at a much higher data rate than the computer system 20 can receive or process such data, the bulk memory 17 is used as an intermediate data storage device for holding the data for later transfer to the computer system 20.

Following the storage of data in the bulk memory 17, at a time when the slave data transfer unit 16 is available for operations other than storing acquired image data, a second master data transfer unit 18 may take control of the data transfer bus 14 and command the slave unit 16 to effectuate the transfer of specified data from the bulk memory 17 to the computer system 20. This transfer is undertaken at a speed commensurate with the capacity of the computer system 20 to receive such data.

The image data transferred to the computer system is processed to enhance the images. An advantageous image enhancement processing technique, called digital subtraction, is described in a paper by Charles A. Mistretta and Andrew B. Crummy entitled "Diagnosis of Cardiovascular Disease by Digital Subtraction", published in SCIENCE, Vol. 214, pp. 261 to 265, 13, November 1981.

Following enhancement processing, the image data may be stored in a mass storage device of the computer system 20 and subsequently viewed on a television monitor (not shown) using conventional techniques. Where the imaging system 10 is provided with its own display, the image data after enhancement may be returned to the bulk memory 17 by means of the second master data transfer unit 18 and transferred to the imaging system 10 by means of a third master data transfer unit 15 as required for viewing.

As an example of the data rates contemplated by the present invention, the imaging system 10 may provide television X-ray image data consisting of 512 lines per frame with 512 pixels per line and up to 10 digital bits per pixel. If the images are processed at a rate of 30 frames per second, the resulting pixel rate is approximately 7.5 megapixels per second, which corresponds to an image data rate of approximately 15 megabytes per second. Accordingly, in a data acquisition time of 4.6 seconds, for example, 64 megabytes of image data are stored in the bulk memory 17. The instantaneous rates of data acquisition from the imaging system to the first master data transfer master 12 are even higher, because the instantaneous rates do not take into account the idle time in a television type system having horizontal and vertical blanking intervals. Accordingly, it is possible that the data from the imaging system 10 may be supplied to the first master data transfer unit 12 at a rate as high as 20 megabytes per second.

In addition to the above-described exemplary capabilities of the system of the present invention, it is intended that the data transfer portions of the system be designed to accomodate future expansion of the system. Such future expansion may include two TV cameras, each of which may provide 30 frames per second of 512 by 512 pixels per frame. Moreover, the imaging rate may be increased up to 60 frames per second, the number of pixels per frame may be increased up to 1,024 by 1,024 or the number of bits per pixel may be increased up to 16. Each of these modifications increases the instantaneous image data rates that must be accommodated by the system.

Those skilled in the art will recognize that data transfer to a computer system cannot in general take place at rates on the order of 20 to 160 megabytes per second, which are the real-time image data rates contemplated by present and future imaging systems to which the present invention is directed. By use of the configuration shown in FIG. 1, however, as will be detailed hereinafter, it is possible to collect image data at rates of up to 160 megabytes per second in a bulk memory 17 and to provide the image data as required to the computer system 20 at a lower rate commensurate with its capacity to receive such data, for example at 8 megabytes per second.

The first master data transfer unit 12, the slave data transfer unit 16 and the second master data transfer unit 18 of FIG. 1 are interconnected by a FASTBUS modular bus system. FASTBUS is a modular data transport and computer interconnection scheme developed under a collaboration between the National Bureau of Standards and the Department of Energy. The FASTBUS system is constructed in accordance with the guidelines set forth in the FASTBUS specification published by the U.S. NIM committee, data November, 1982 and available from the Department of Commerce, National Bureau of Standards, Washington, D.C. 20234. The aforementioned FASTBUS specification is incorporated herein by reference. That specification calls for at least one 60 line bus for interconnecting master and slave devices of the FASTBUS based system. In FIG. 1, and in subsequent figures, this bus has been indicated as comprising data lines and control lines. It should be understood by those skilled in the art that the data lines represent the address/data lines consisting of 32 lines as called for in the aforementioned FASTBUS specification. The remaining lines have generally been referred to as control lines, but it should be understood that these lines transfer timing as well as control signals. Much of the terminology used in this application in connection with the FASTBUS system is taken from the aforementioned specification where such terminology is defined.

Figure 2A:
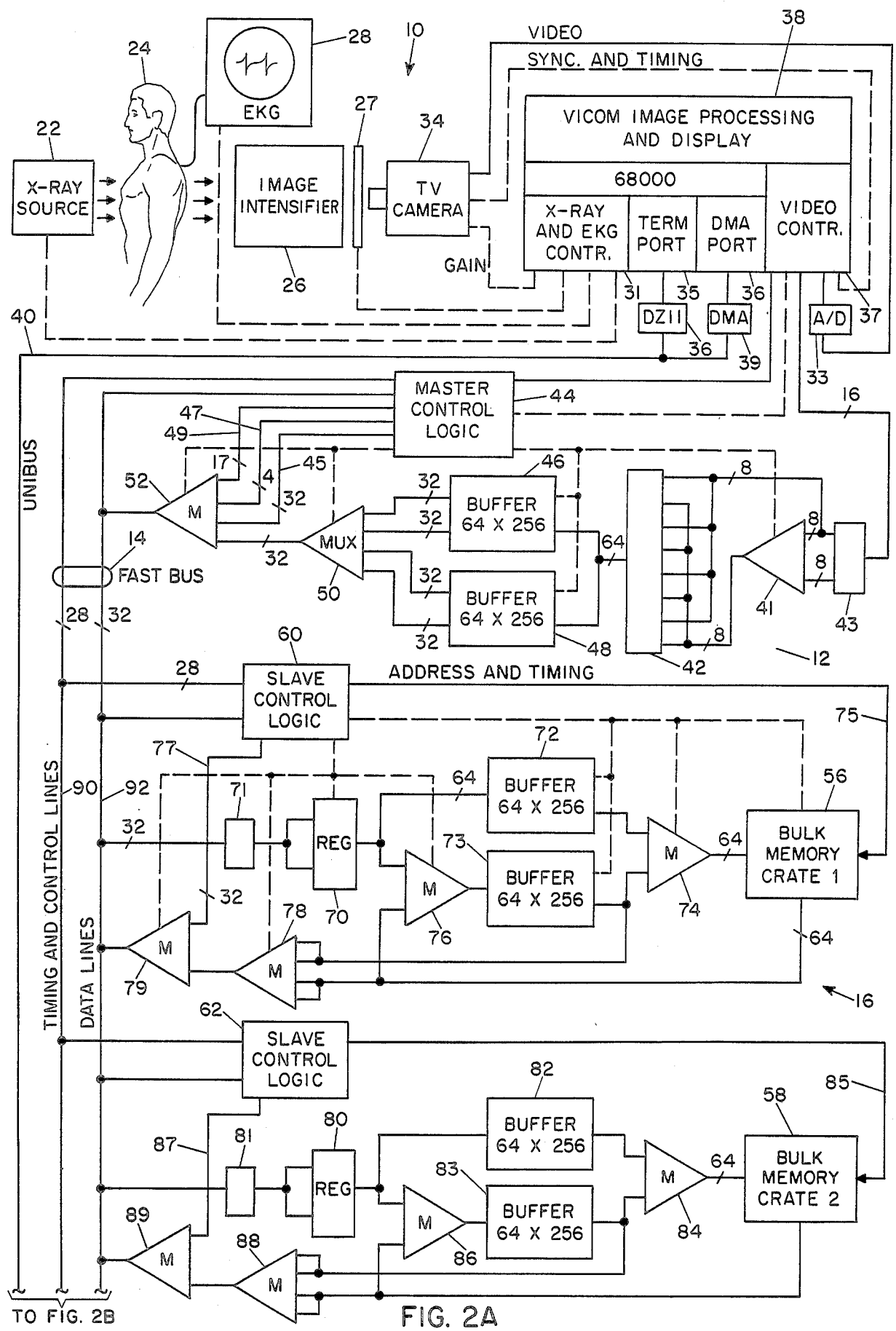
FIGS. 2A and 2B are schematic diagrams illustrating the system of FIG. 1 in greater detail.
Figure 2B:
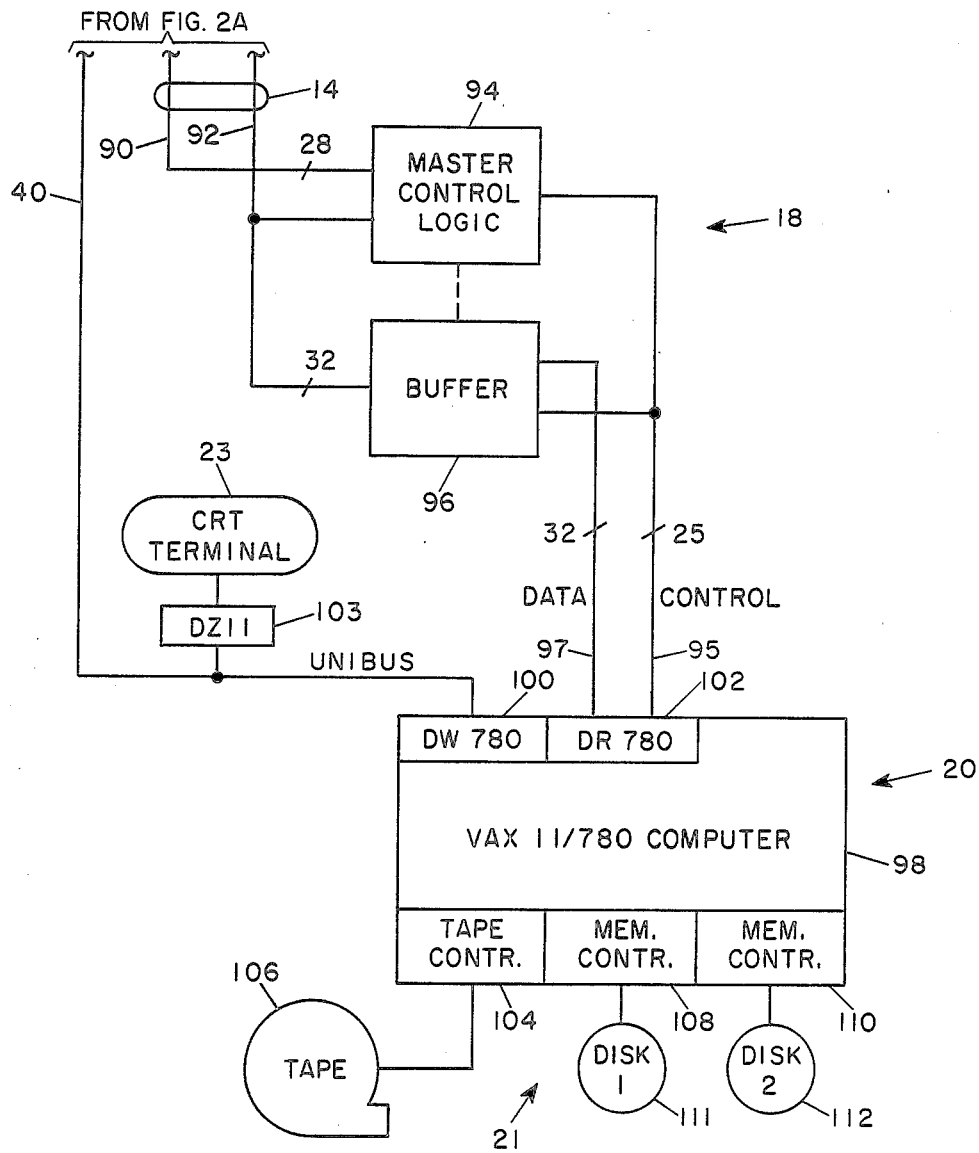

FIGS. 2A and 2B illustrate further details of the system of FIG. 1, with particular application to an image data processing system for obtaining image data representative of the human heart using X-ray techniques. As shown in FIG. 2A, the imaging system which provides the image data includes an X-ray source 22, such as a CGR Medical Corporation Model CPG 20 Generator and Collimator, from which X-rays are directed through a portion of the patient's body 24 including the heart and into a Thompson CSF X-ray image intensifier 26. The patient 24, who has received an intravenous injection of an X-ray contrast medium, such as Renographin 76 available from E. R. Squibb and Sons Inc., is also connected to electrocardiogram (EKG) monitor 28 which provides EKG signals to the microprocessor 32 through an X-ray and EKG controller 31. A TV camera 34, such as a Hamamatsu System, Inc. Model C1800, is arranged to pick up images from the image intensifier 26 and provide the video signals corresponding to the image to an analog-to-digital (A/D) converter 33, such as an Analog Devices, Inc. Model MOD-1020. An iris 27 is positioned between the image intensifier 26 and the lens of the TV camera 34. The images are acquired at a rate of 30 frames per second, which is sufficient to avoid significant blurring of the images caused by heart motion and other tissue and bone movement. The A/D converter 33 digitizes each pixel of the images into a 10 bit code and operates at a sampling rate of up to 20 MHz. In order to accomodate further refinements of the imaging system towards higher image contrast resolution, A/D converters providing longer codes, such as up to 16 bits per pixel may be used. The digitized image data from the A/D converter 33 is provided to an image processing and display system 38, such as the VICOM Systems, Inc. Model 1500. The VICOM system includes the MC68000 microprocessor 32 and is further provided with the X-ray and EKG controller 31, a terminal port 35, a DMA port 36 and a video controller 37. The microprocessor 32 provides control and timing signals to the X-ray source 22, aperture control signals to the iris 27 and gain control signals to the TV camera 34 through the X-ray and EKG controller 31 of the VICOM 38. The video controller 37 of the VICOM 38 receives the digitized image data from the A/D converter 33 and provides image data in the form of words each representing 1 pixel of the image and timing signals to the first master control logic 44. The image data provided by the VICOM 38 are assembled under the control of the first master control logic 44 into 64 bit words in register 42 by means of buffers 43 and a multiplexer 41.

Figure 3:
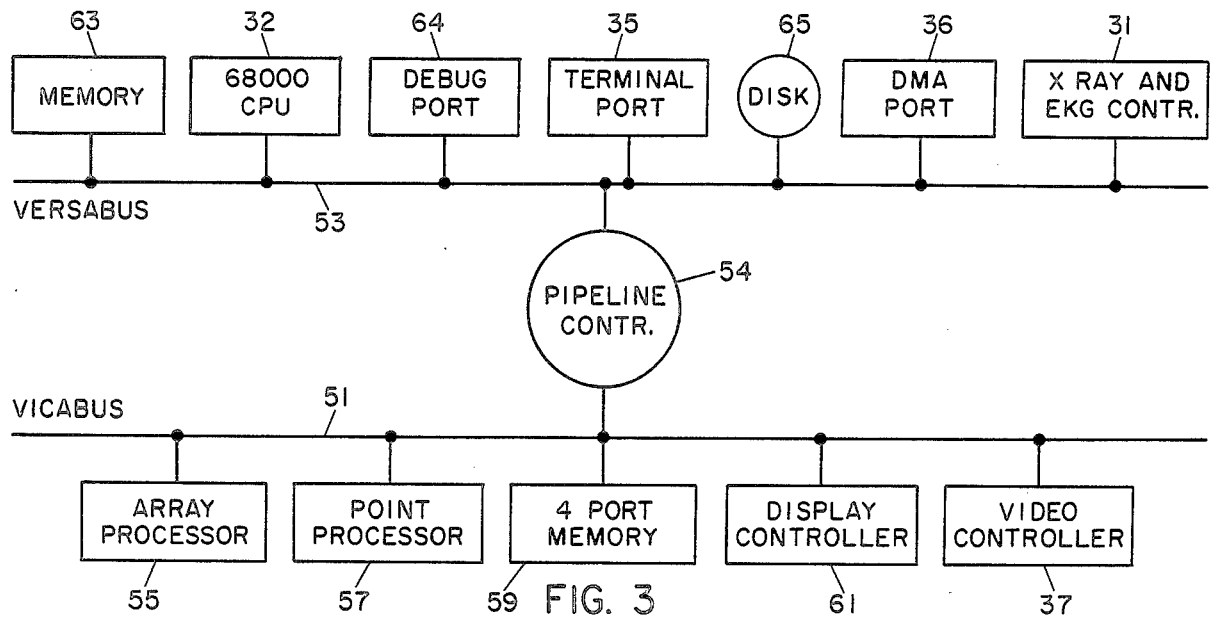
FIG. 3 is a schematic diagram illustrating the internal architecture of the VICOM.

The internal architecture of the VICOM 38 is schematically illustrated by the diagram of FIG. 3. Referring now to FIG. 3, the VICOM includes 64 bit VICABUS 51 and a 16 bit VERSABUS 53 intercoupled by a pipeline controller 54, which controls communication between the two buses. The VICABUS 51 is coupled to an array processor 55 and a point processor 57, both of which execute image processing algorithms. Also coupled to the VICABUS 51 are a 4 port memory 59 for storing image data, a display controller 61 for interfacing the CRT display of the VICOM, and the video controller 37. The VERSABUS 53 is coupled to the microprocessor 32, a memory 63 for the microprocessor and a disk drive 65 for storing the control program for the microprocessor and the VERSADOS operating system. The VERSABUS 53 is also coupled to the terminal port 35, the DMA port 36 and the X-ray and EKG controller 31.

Referring again to FIGS. 2A and 2B the microprocessor 32 is responsive to commands supplied by the computer system 20, which in the illustrated embodiment comprises a Digital Equipment Corporation VAX 11/780 computer 98 having a KA-780 Central Processing Unit with FP-780 Floating Point Accelerator and dual Interleaved MS-780 Memory Controllers with 3.0 MB of main memory (not shown). The VAX computer 98 is also equipped with a DR-780 8.0 MB/sec. Intelligent Parallel Interface 102; dual RH-780 Massbus Adapters 108 and 110 with dual RP-07 516 MB disk drives 111 and 112 having 2.2 MB/sec transfer rate; a TU-78 6250 BPI, 125 inch/sec magnetic tape drive 106 with tape controller 104; a DW-780 UNIBUS Adapter 100, a VS-11 graphics terminal (not shown); and a DZ11 terminal multiplexer 103 with a VT100 CRT terminal 23. The control signals from the VAX 11/780 computer to the microprocessor 32 are provided via the UNIBUS 40 of the DW-780 interface 100 through a second DZ11 multiplexer 36 to the terminal port 35 of the VICOM 38. The UNIBUS 40 is also coupled to the DMA port 36 of the VICOM 38 through a DMA interface 39. The DR780 device 102 is a programmable interface for 32 data lines and 25 control lines. This interface has the capability of receiving 32 bit parallel data at a rate of up to 2 MHz and of transferring that data to the main memory of the computer 98. The high-speed tape unit 106 may be used for archive storage of image data.

In addition to supplying control signals to initiate and control the manner of execution of the control program in the microprocessor 32, the interfaces on the UNIBUS 40 may also be used for transferring image data between the computer 98 and the image processing system 10.

The X-ray and EKG controller 31 is used to synchronize the operation of the X-ray generator 22 with the acquisition of image data and to receive and store EKG information from the EKG monitor 28. The X-ray and EKG controller 31 also provides interactive control of the opening of the iris 27 and the video gain of the TV camera 34, as well as simulation modes to permit testing of the imaging system 10 without the X-ray generator 22 being connected.

The EKG information is received by the X-ray and EKG controller 31 in the form of analog signals from the EKG monitor 28 and is digitized by an internal analog-to-digital converter. The digitized EKG signals are then stored in the memory 63 of the 68000 microprocessor by direct memory access. Up to 10 minutes of continuous digitized EKG information may be stored. The memory 63 also stores markers indicating when each frame of acquired image data was completed. The EKG information and the frame markers are used to correlate the image data with the EKG signals. The EKG signals are also received by a circuit in the X-ray and EKG controller 31 which provides a digital signal corresponding to the occurrence of the QRS complex of the EKG signals. This signal is used to start first and second programmable delay counters within the X-ray and EKG controller 31.

Two modes of operation are provided by the X-ray and EKG controller 31, namely an EKG gated mode and a fixed time interval mode. In the EKG gated mode, image data are acquired in two bursts of frames. The first burst takes place after a first delay following the QRS complex of the EKG signals. The first delay is determined by the first programmable delay counter, which is started upon the occurrence of the QRS complex of the EKG signals. The second burst of frames takes place after a second delay following the QRS complex. The second delay is determined by the second programmable delay counter, which is stated at the same time as the first delay counter. The first and second delays, the number of frames acquired in the first and second bursts and the frame rates of the first and second bursts are all programmable through appropriate commands from the VAX computer 98 to the microprocessor 32 for loading programmable counters in the X-ray and EKG controller.

The X-ray and EKG controller 31 is provided with detection circuitry for sensing the activation of the X-ray generation 22 by the operator. The X-ray generator is activated when a PREPARATION/EXPOSURE button 139 is depressed. Image data acquisition can begin only if the X-ray generator 22 is activated. If the operator releases the PREPARATION/EXPOSURE button to abort the X-ray procedure, image data acquisition is terminated by the X-ray and EKG controller.

In the second mode of operation, image data are continuously acquired at a fixed frame rate following the depression of the PREPARATION/EXPOSURE button 139 by the operator. The acquisition of image data continues until a desired number of frames are obtained unless the operator aborts the procedure by releasing the PREPARATION/EXPOSURE button 139. The beginning of image data acquisition may be delayed up to 12 seconds after the PREPARATION/EXPOSURE button is depressed. This delay together with the frame rate and number of frames are all programmable through appropriate commands from the VAX computer 98 to the microprocessor 32 for loading programmable counters in the X-ray and EKG controller 31. In normal operation of the imaging system 10, the PREPARATION/EXPOSURE button 139 of the X-ray generator 139 is depressed immediately upon intravenous injection of the contrast medium into the patient 24. The delay between the injection of the contrast medium and the acquisition of image data allows the contrast medium to pass from venous to arterial circulation in the patient 24.

The X-ray and EKG controller 31 further includes two internal programmable registers containing quantities representative of the opening of the iris 27 and the video gain of the TV camera 34, respectively. The contents of those registers are applied to separate analog-to-digital converters in the X-ray and EKG controller 31 for deriving voltage signals to control the iris opening and the TV camera gain.

The video controller 37 includes a VICABUS control interface which allows data to be written to and read from the VICOM image memory 59 (FIG. 3). This controller provides the data interface between the VICOM image memory 59 and the data paths from the TV camera 34 and to the first master data transfer unit 12. Where the FASTBUS system is provided with a third master data transfer unit 15 (FIG. 1), the video controller 37 also provides the data interface between the VICOM image memory 59 and the data path from the third data transfer unit 15.

In addition to providing all high speed accesses to the VICOM image memory 59, the video controller 37 also includes a master synchronization generator providing signals for controlling the pixel, horizontal and vertical timing for the TV camera 34 and the data transfer timing for the first and third master data transfer units 12 and 15. In addition, a high speed port for the microprocessor 32 to the image memory 59 is also implemented in the video controller 37.

The master synchronization generator of the video controller can be programmed through appropriate commands from the VAX computer 98 to the microprocessor 32 to create different image formats for digital subtraction angiography. The signals from the master synchronization generator also control the timing of the digitization of analog video signals in the analog-to-digital converter 33.

During image data acquisition, synchronized digital image data received from the analog-to-digital converter 33 are transferred directly to the image memory 59 for display, and simultaneously transferred to the first master data transfer unit 12. Thus, the image data may be viewed while it is being acquired.

Where the system is provided with a third master data transfer unit 15, a high speed mode for the playback of image data after processing by the computer system 20 is available. In this mode, the processed image data is first transferred to the bulk memory 17 by the second master data transfer unit 18, and then transferred to the video controller 37 of the VICOM 38 by the third master data transfer unit 15. The video controller 37 receives the processed image data and stores it in the image memory 59 at a rate of up to 30 frames per second. A slower speed playback mode is also available by transferring the processed image data directly from the computer system 20 over the UNIBUS 40 to the DMA port 36 of the VICOM 38. The processed image data received at the DMA port 36 are transferred to the video controller 37 via the VICABUS and stored in the image memory 59 at a rate of up to two frames per second.

The control program of the microprocessor 32 is entitled "ROOT". When the ROOT program is activated by the operator through an appropriate command entered on the terminal 23, a subroutine entitled "MAPPER" is called. This subroutine is required by the VERSADOS operating system for allocating a shared memory segment to permit access to control registers in the X-ray and EKG controller 31 and the video controller 37, and to permit access to the image memory 59. After the return from the MAPPER subroutine, another subroutine entitled "MAIN" is called. Because MAIN is the principal subroutine of the control program, a return to ROOT is obtained only by the execution of the QUIT command. Flow diagrams representing the ROOT program, the MAPPER subroutine and the MAIN subroutine are shown in FIGS. 11, 12 and 13, respectively.

Referring now to FIG. 13, the first step in the MAIN subroutine is the initialization of the control registers of the X-ray and EKG controller 31 and the video controller 37 to a known state, and the setting of the initial parameters of the control program. During the initialization process, all command names and error messages are defined. Following the initialization step, the MAIN subroutine waits for a command from the VAX computer 98 received through either the terminal port 35 or the DMA port 36. These commands may be issued by the VAX program or entered by the operator from the terminal 23.

When a command is received, a parse command string routine is called to separate the command into the base command and its parameters. After the received command is parsed, the MAIN subroutine determines whether the command is an acquisition command, a processing command or the QUIT command. If the command is the QUIT command, control is returned to the ROOT program for termination of execution. If the received command is a processing command, the VICOM image processing algorithm specified by the parameters of the command is executed.

If the received command is an acquisition command, a subroutine called CAMERA is called. A flow diagram representing the CAMERA subroutine is shown in FIG. 14. Referring now to FIG. 14, the CAMERA subroutine processes the following commands: NDIG, NCAM, NVCS, DSIM, ESIM, IRIS, GAIN, DIVA, and EKG.

The NDIG command causes a single frame of information from the TV camera 34 (FIG. 2A) to be digitized and stored in the image memory 59 (FIG. 3). The portion of the image memory 59 which is to receive the image data is specified in a parameter of the NDIG command.

The NCAM command causes video information to be continuously digitized and stored in the image memory 59. The execution of this command results in a display on the VICOM CRT (not shown) that is continuously updated. Such a display is used for focussing the TV camera 34 and positioning the image. The portion of the image memory 59 which is to receive the image data is specified in a parameter of the NCAM command.

The NVCS command is used to assign the acquisition parameters. These parameters are: interlaced/sequential scan, video source (e.g., TV camera, FASTBUS, UNIBUS, or the microprocessor), internal/external triggering of video acquisition, vertical and horizontal sweep reversal in the TV camera, and internal/external synchronization of the TV camera.

The DSIM command assigns the simulation parameters in the X-ray and EKG controller for simulating the firing of X-rays for an exposure rate of one frame per second. This command is terminated after the execution of the DIVA command.

The ESIM command assigns simulation parameters in the X-ray and EKG controller for simulating the receipt of the QRS complex of EKG signals. This command allows simulation of the EKG gated acquisition mode without connecting the EKG monitor 28 (FIG. 2A) to a patient. This command is terminated after the execution of the EKG command.

The IRIS command causes the iris 27 (FIG. 2A) to be opened to its maximum aperture and then closed to an aperture size specified in a parameter of the command. The reason for first opening the iris to its maximum aperture before setting the desired aperture size is to avoid the effects of mechanical hysteresis.

The GAIN command causes the TV camera gain to be set to a value specified in a parameter of the command.

The DIVA command causes the acquisition of image data in the fixed time interval mode. The parameters of this command specify the number of frames to be acquired, the frame rate and the delay time from the activation of the X-ray generator 22 (FIG. 2A) by the operator to the start of acquisition of image data.

The EKG command causes the acquisition of image data in the EKG dated mode. The parameters of this command specify the total number of frames to be acquired, the number of frames to be acquired in each of the first and second bursts, the frame rate in each of the first and the second bursts and the delays from the detection of the first QRS complex following activation of the X-ray generator to the start of the first and second bursts.

After processing of each received command, control is returned to the MAIN subroutine and an end-of-command prompt is sent to the VAX computer 98. The MAIN subroutine then waits for the next command from the VAX computer 98. A source code listing of the ROOT program and its subroutines is included in appendix I.

Referring again to FIG. 2A, the first master transfer unit 12 includes first master control logic 44, first and second buffers 46 and 48, and multiplexers 50 and 52. The buffers 43 and the multiplexer 41 of the first master transfer unit 12 are operated by control and timing signals generated by the master control logic 44. Operation of the control logic 44 is initiated by the program of the computer system 20 and receives timing signals from the imaging system 10 so that it can operate the digital portions of the image data acquisition system in synchronism with the acquisition of analog video information by the TV camera 34 and its digitization by the A/D converter 33.

The first master control logic 44 provides control signals for the operation of the register 42, the buffers 46 and 48, and the multiplexers 50 and 52. The first master control logic 44 also provides timing and control signals on the twenty-eight FASTBUS control lines 90 for signalling the operation of the control logic to other devices coupled to the control lines 90 of data transfer bus 14. In addition, the first master control logic 44 provides control signals to slave units connected to the control bus 90. The signals on the control lines 90 are in the FASTBUS signal format described in the above-referenced specification for FASTBUS operation. Thirty-two data lines are connected as data outputs to the multiplexer 52 for transmissions of digital data, as will be further described.

Under the control of the first master control logic 44, the digitized image data is assembled into 64 bit words in the register 42. The first master control logic 44 further controls the register 42 to effectuate the transfer of the 64 bit words into the buffers 46 and 48. Data is transferred into one or the other of the buffers 46 and 48 in order to assemble data blocks each consisting of up to 256 words of 64 bits each. A first data block is assembled in the buffer 46 and a second data block is assembled in the buffer 48 and so on. As the second data block is being assembled, the first data block is being transmitted onto the data lines 92 in pipeline fashion, as will be further explained.

The multiplexer 50 has a 4 to 1 multiplexing function and is 32 bits wide, so that it may transmit from its output lead 32 bit half-words from either the buffer 46 or the buffer 48. It should be noted that the size of the buffers 46 and 48 is selected to correspond to a single scan line of digitized pixel data for any format containing up to 1024 pixels. Should the scan line contain less than 1024 pixels or the pixel word is less than 16 bits, the buffers 46 and 48 are only partially filled.

During the scanning operation of the TV camera 34, video information is sampled by the A/D converter 33 and digitized on a pixel basis. The digitized image data are provided to the VICOM system 38, which assembles such data as single pixels words which are in turn assembled into 64 bit words in the register 42. As mentioned earlier, up to 256 of such words are assembled to form a data block in the buffer 46 for the first scan line of the TV camera 34. This operation takes place during the active scan line of the TV camera. Since the TV camera 34, the A/D converter 33, and the register 42 and the buffers 46 and 48 are controlled directly or indirectly by the first master control logic 44 and the image processing system 10, the entire operation is coordinated.

After the data block containing one scan line of digital video information is assembled in the buffer 46, the master control logic 44 switches operation to cause the next block of up to 256 words of digitized video information corresponding to the next scan line to be loaded into buffer 48. During this process, the master control logic 44 operates the multiplexers 50 and 52 to effectuate a block transfer of data from the buffer 46 onto the data lines 92 of the data transfer bus 14 for storage in bulk memory.

Prior to the block transfer operation, the master control logic 44 takes control of the FASTBUS 14 by asserting the appropriate signals on the control lines 90. It also supplies an address signal through the multiplexer 52 and the control lines 90 to the slave control logic 60, which will be further described. This preamble assertion on the data transfer bus and addressing function take place prior to the initiation of the block transfer of the data stored in the buffer 46, for example, immediately upon the conclusion of the writing of data in the buffer 46. The timing of these control signals is governed by the master control logic 44.

The multiplexer 50 provides 32 bit words during the block data transfer by alternately selecting half words from the buffer 46 until all 64 bit words comprising the first scan line have been divided to the data lines 92 as 32 bit FASTBUS words. The transfer onto the data lines 92 takes place at a clock rate of 40 MHz using the MS=3 FASTBUS transfer mode (synchronous block transfer with no handshake). This block transfer mode provides the fastest available data transfer speed for the FASTBUS system. Following the transfer of the first block of data from the buffer 46, and after the second data block corresponding to the second scan line of digitized video information has been assembled in the buffer 48, a second block transfer to the data lines 92 takes place out of buffer 48. This block transfer is preceded by a similar address preamble as described above.

Figure 4:
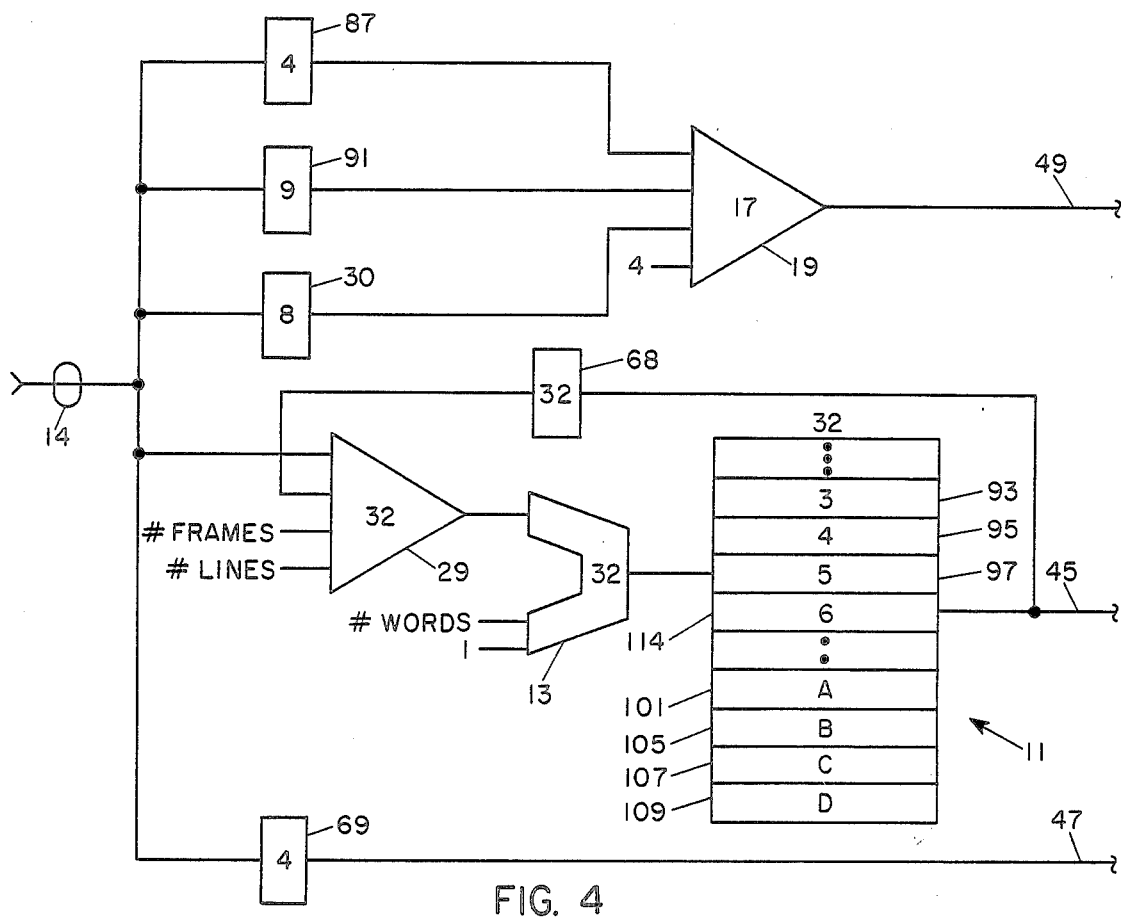
FIG. 4 is a schematic diagram illustrating the data paths of the first (VICOM to FASTBUS) master control logic.

The data paths in the first matter control logic 44 are illustrated in the schematic diagram of FIG. 4. Referring now to FIG. 4, the numbers above the circuit elements in the schematic diagram indicate the width of the element in bits. The data paths of the first master control logic include a 16 location 32 bit scratch pad register memory 11; a 32 function arithmetic logic unit 13 with carry look-ahead; multiplexers 19 and 29; data latches 30, 68 and 69; and flip-flops 87 and 91.

The first master control logic 44 includes an instruction register (now shown). Four fields within this register are used to specify certain control parameters. A first field of the instruction register specifies the number of image frames to be acquired and transferred to bulk memory via the FASTBUS. This field is a 3-bit wide field and may be used to specify any number of frames less one directly in the field. A second field of the instruction register specifies the number of scan lines encoded as the exponent of two of that number. This field is two bits wide and may be used to specify values of 128, 256, 512, or 1024 lines per frame encoded as the values of 0, 1, 2, or 3, respectively. A third field of the instruction register is used to specify the number of pixels per line encoded in a fashion similar to that used to specify the number of lines per frame. A fourth field of the instruction register is used to specify the number of data bits stored per pixel. For instance, a single bit may be used to determine whether 8 or 16 data bits are stored per pixel.

Other necessary control quantities may be derived from the fields in the instruction register. For example, the number of FASTBUS words needed to transfer an image scan line may be derived from the number of pixels per line and the number of bits per pixel, where this number of words is one quarter the number of pixels if 8 data bits are stored per pixel, or is one half the number of pixels if 16 data bits are stored per pixel.

In addition to the data paths illustrated in FIG. 4 the first master control logic 44 includes three distinct portions. These control the filling of the double data buffers 46 and 48 with data received from the VICOM video controller 37, the emptying of the double buffers 46 and 48 to the bulk memory controllers during operation as a FASTBUS master, and access to the control registers 11, 30, 87, 69 and 91 in the first master data transfer unit 44 during operation as a FASTBUS slave.

All of the control logic with the exception of FASTBUS arbitration control is of clocked design, with the clock for the first section being furnished as one of the control signals from the VICOM video controller card, while the clock for the second and third sections is provided by a crystal oscillator in the first master control logic 44. The frequency of this oscillator controls the bandwidth with which data are transferred to the FASTBUS. For example, a 40 megahertz clock frequency results in a data transfer rate of 160 megabytes per second.

The control logic for accessing the control registers follows the FASTBUS specification mentioned previously, and is of conventional design requiring synchronization of the FASTBUS AS and DS signals to the crystal clock. That logic controls the FASTBUS Control/Status Registers 87, 91, 93, 95, 97, 30, 101 and 105, as well as the control space Internal Address Register 69. Registers 93, 95, 97, 101, and 105 are implemented as locations within the scratch pad 11. The control logic generates the FASTBUS handshake signals AK and DK, as well as the slave status SS. Load strobes for the interval address register 69, registers 87, 91 and 30, and the scratch pad 11 are generated in response to FASTBUS write operations.

During read operations the multiplexers 19 and 52 (FIG. 2A) are manipulated as necessary to provide data from the requested register to the FASTBUS data lines. During write operations, the multiplexer 29 is set to select the received FASTBUS data lines for connection to the ALU 13 "A" input, and the ALU 13 is set to connect the "A" input to the scratch pad input.

Referring now to FIG. 2A, the control logic for filling the buffers generates load strobes for the 8 bytes of the 64 bit wide register 42, write pulses for all portions of the double data buffers 46 and 48, and addresses for the data buffer currently being loaded. Each 32 bit half of the register 42 and each 32 bit half of each data buffer 46 and 48 are operated independently. Each half of the register 42 is loaded with either 4 successive 8 bit pixels or 2 successive 16 bit pixels. Following completion of the loading of one half of the register, a write pulse is generated in the corresponding half of the current data buffer 46 and 48, while loading of additional pixels proceeds in the other half of the register 42. The address of a 32 bit half of a data buffer 46 or 48 is incremented upon the conclusion of the write pulse to that half buffer. Additional control logic verifies that the expected number of pixels were received from the VICOM video controller card in each scan line, and that the expected number of scan lines were received in each frame.

The control logic for emptying the buffers manipulates multiplexers 50 and 52 as necessary to furnish the data from one of the double data buffers 46 and 48 to the FASTBUS data lines 92. Referring now to FIG. 4, this logic also utilizes additional locations in the scratch pad 11 for temporary storage. For instance, location 107 may contain the number of frames remaining to be acquired, location 109 the number of scan lines remaining in the current frame, and location 114 the current FASTBUS logical address in bulk memory to which the next scan line is to be transferred. Register 107 may be initialized by setting the multiplexer 29 to select the number of frames (minus one) to be transferred as described above, while setting the ALU 13 to add one to this number. Thereafter, the register is decremented once per frame transfer by first copying register 107 to the scratch latch 68, and then by setting the multiplexer 29 to select the scratch latch 68 and setting the ALU 13 to subtract one from the output of the multiplexer 29. The ALU 13 output is then written into register 107 in the scratch pad 11 as the new decremented value.

The zero detect logic of the ALU 13 may also be used to detect the last frame to be transferred. In a similar fashion, register 109 may be initialized by setting the multiplexer 29 to select the number of lines per frame and the ALU 13 to pass this number unmodified. Likewise, the procedure outlined above may be used to decrement register 109 and to detect the last line in a frame. Register 114 may be initialized by first copying register 95 to the scratch latch 68, and then copying the scratch latch 68 to register 114. The contents of register 114 may then be furnished to the FASTBUS data lines 92 during the address prologue to a block transfer operation as described previously.

Following a successful block transfer, register 114 may be updated by first copying it to the scratch latch 68, then utilizing the ALU 13 to add the number of FASTBUS words per scan line to this value, and writing the result as the updated register 114 back into the scratch pad 11. Finally, the control logic may generate a FASTBUS interrupt at the conclusion of the acquisition of a number of frames. For instance, a FASTBUS address cycle may be generated while driving the contents of register 101 onto the FASTBUS data lines 92. Thereafter, a FASTBUS secondary address cycle may be generated while transferring the contents of register 105 into these same data lines 92. A series of data cycles may then be generated in handshake-block-transfer mode while manipulating the multiplexers 19 and 52 (FIG. 2A) and the scratch pad address lines to provide the constant "4" (from the multiplexer 19). Registers 93, 87 and 91 and the final contents of register 114 are in turn driven to the FASTBUS data lines 92.

It should be recognized that the fastest instantaneous data rate for 512 pixel by 512 scan lines at 30 frames per second and 16 bits per pixel is approximately 20 megabytes per second. Allowing for horizontal blanking intervals, the average data rate supplied from the TV camera 34 to the data lines 92 via the buffers 46 and 48 is approximately 15 megabytes per second. Since the FASTBUS system accomodates 4 byte words and a clock rate of up to 40 MHz, data rates of up to 160 megabytes per second can be achieved. The data acquisition system may be expanded by providing additional TV cameras. The addition of each further camera requires the addition of another video controller to the VICOM and another master data transfer unit to the FASTBUS.

It will also be recognized that assuming the availability of higher speed analog-to-digital conversion equipment, it may be desirable in some instances to operate with a television system having a larger number of scan lines per frame, such as 1,024, and a larger number of pixels per scan line, such as 1,024. In such instance, each buffer 46, 48 would hold a single television scan line of digitized video information. The instantaneous rate of digitized television information for a 1,024 by 1,024 pixel television frame would by approximately 45 megapixels per second corresponding to a data rate of 90 megabytes per second. When horizontal blanking intervals are taken into account, the average data rate is approximately 70 megabytes per second. Two such systems interleaving image data on the FASTBUS system would almost utilize its full 160 megabytes per second data transfer capability.

As previously mentioned, the first master data transfer unit 12 acts as a FASTBUS master device capable of taking control of the bus 14 and performing transactions with slave devices, including transferring data into a bulk memory. FIG. 2A shows additional details relating to the configuration for data flow into the bulk memory. In the configuration shown in FIG. 2A, there are provided two bulk memory crates, 56 and 58, which are respectively labeled "Bulk Memory Crate 1" and "Bulk Memory Crate 2." Each of these bulk memory crates is provided with its own separate slave data transfer unit each having its own slave control logic 60 and 62. Each slave data transfer unit acts as a slave device in the FASTBUS system and responds to address and control signals from the first and second master data transfer units 12 and 18 on control lines 90 and data lines 92. The bulk memory sytem may be expanded by providing additional memory crates. However, addition of each further memory crate requires the addition of another slave data transfer unit 16 to the FASTBUS.

During the FASTBUS addressing preamble, as previously discussed, the master control logic 44 assumes control of the FASTBUS by asserting the appropriate control signals on control lines 90. The slave control logic devices 60 and 62 can respond to these signals if they are particularly addressed. During the initializing interval for a block transfer, the master control logic 44 provides address signals via the multiplexer 52 onto the data lines 92 for setting the control of the slave control logic devices 60 and 62 to access the memory locations at which the data block to be transferred will be stored in "Bulk Memory Crate 1" or "Bulk Memory Crate 2."

Following the initializing process, the block transfer is initiated by the master control logic 44 in a no-handshake format from one of the buffers 46 or 48 to a corresponding buffer 72, 73, 82 or 83 in the slave data transfer unit 16. The data path for such transfer includes register 70 or 80, which serves to assemble corresponding 32 bit FASTBUS words into 64 bit image data words.

The first block transfer, for example, from the buffer register 46 would be provided to the buffer 72 via register 70. Following the first block transfer, a second block transfer, for example from the buffer 48, would take place to buffer 82 via register 80. During this second block transfer, the movement of data from the buffer 72 by the multiplexer 74 onto the "Bulk Memory Crate 1"

takes place in response to control and address signals generated by the slave control logic 60.

The transfer of data from the buffer register 72 into "Bulk Memory Crate 1" continues to take place while a third block transfer of data takes place to buffer 73. During this third block transfer, the slave control logic device 62 initiates the transfer of data from the buffer 82 into "Bulk Memory Crate 2" and the transfer of data from the buffer 72 into "Bulk Memory Crate 1" is completed under the control of slave control logic 60.

This process continues, using alternate bulk memory crates for alternate block transfers, and alternate buffers for alternate block transfers to each of the memory crates. By this process, it is possible to reduce the transfer rate of 40 MHz per 32-bit FASTBUS word on the data lines 92 to a rate of 10 MHz for writing into each of the two bulk memory crates. This writing speed is achievable in conventional bulk memory crates, such as the Intel Corporation series 90 ECX memory. This memory is arranged in memory units called "crates" each containing 16 megabytes of 65K dynamic random-access-memory (RAM) configured as 2 megawords of 64 bits plus 8 error detection and correction (ECC) bits each. In addition, each crate includes power supplies and an error logger. The presence of the error logger removes the need to provide hardware and software to note the location of single bit errors within the bulk memory system.

The crate controller is capable of operating at a 100 nanosecond cycle time, provided that successive cycles are distributed to different array cards within the crate. Thus, interleaving of the memory array cards within each crate is required to achieve a crate throughput of 80 megabytes per second. This array card interleaving combined with the interleaving of two or more bulk memory controllers on the FASTBUS and the double buffering within each controller allows the multiple bulk memory crate configuration of FIGS. 2A and 2B to support continuous FASTBUS data transfers at 160 megabytes per second in the MS=3 mode.

Figure 5:
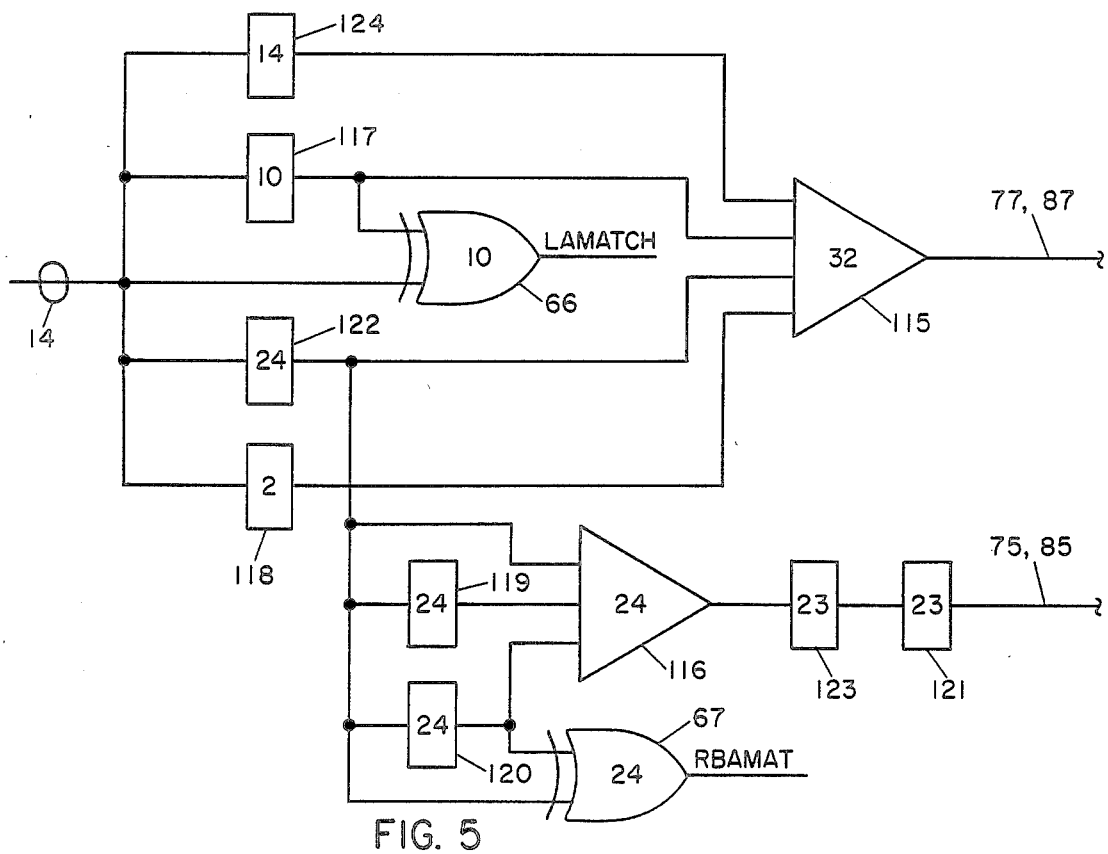
FIG. 5 is a schematic diagram illustrating the data paths of the slave (FASTBUS to bulk memory) control logic.

The data paths of each of the slave control logic 60 and 62 are schematically illustrated in FIG. 5, in which the number above each circuit element denotes the width of the element in bits. Referring to FIG. 5, the data paths of the slave control logic 60 and 62 include multiplexers 115 and 116; data latches 117, 118, 119, 120, and 121; look-ahead carry counter 122 and 123; flip-flop 124; and comparator 67. In addition to the data paths shown in FIG. 5, each of the slave control logic 60 and 62 is composed of three distinct portions. Referring to FIG. 2A, the first two of these are clocked by a crystal oscillator within the slave control logic 60 and 62, and effect control of data transfers between the FASTBUS data lines 92 and either the bulk memory crate 56 and 58 or control registers (not shown) within the control logic 60 and 62, respectively. The frequency of this clock oscillator determines the bandwidth with which data are transferred to the FASTBUS data lines 92 in a no-handshake read mode. For instance, a clock frequency of 40 megahertz results in a data transfer rate of 160 megabytes per second.

The third portion of the slave control logic 60 and 62 controls the loading of the double buffers 72, 73, 82, and 83 from the FASTBUS data lines 92 during no-handshake writes to the bulk memory crates 56 and 58. This section is clocked by an oscillator within the control logic whose frequency is greater than 5/2 the frequency of the clock oscillator within the first master control logic 44. For example, if the clock oscillator in the first master control logic 44 is chosen to run at 40 MHz, this clock oscillator within the slave control logic 60 and 62 may run at 105 megahertz, which is greater than 5/2 of 40 megahertz.

The control logic for accessing control registers again follows the aforementioned FASTBUS specification and operates in a fashion similar to the corresponding control logic in the first master control logic 44. Referring again to FIG. 5, that logic controls FASTBUS Control/Status registers 124 and 117, as well as the data space Internal Address 122 register and the control space Internal Address register 118. During FASTBUS write operations, the logic generates load strobes for those registers, while during FASTBUS read operations it manipulates the 115 and 52 (FIG. 2A) multiplexers to gate data from a selected register onto the FASTBUS data lines 92.

Returning now to FIG. 2A, the control logic for loading the double buffer controls the loading of data from the FASTBUS data lines 92 into the registers 71, 81 and 70, 80 as well as generating write pulses and memory addresses for the currently used data buffer 72, 73, 82, or 83. Data are latched from the FASTBUS data lines 92 into 32 bit register 71 or 81 on any logic level transition of the FASTBUS DS data strobe. During handshake operations, data are immediately transferred from register 71, 81 to one half of the 64 bit assembly register 70, 80. Data are transferred to the low half of register 70, 80 after false to true transitions of DS, and to the high half of register 70, 80 after true to false transitions of DS. During no-handshake write operations, a write pulse for the corresponding 32 bit wide half of a data buffer 72, 73, 82 and 83 is generated subsequent to the loading of the 32 bit half of register 70, 80 which supplies data to that half buffer, and the memory address of the buffer is advanced following the completion of this buffer write operation.

The bulk memory data transfer control logic is responsible for routing memory data words between the bulk memory crates 56 and 58 and the FASTBUS data lines 92. During handshake-block-transfer writes to the bulk memory, 56, 58, 64-bit data words are first built up from two FASTBUS data words in the assembly register 70, 80, and then transferred via the multiplexer 74, 84 to the bulk memory crate 56, 58. During no-handshake block transfer writes the data words are transferred from the data buffer 72, 73, 82 and 83 via the write multiplexer 74, 84 after a complete block of data containing one image scan line has been loaded into a buffer. During handshake-block-transfer read operations, 64-bit bulk memory words are provided to the FASTBUS data lines 92 as two successive 32 bit words via the line multiplexer 78, 88. During no-handshake read block transfer operations, data words comprising a complete image scan line are transferred from the second data buffer 73 and 83 to the FASTBUS data lines 92 via the line multiplexer 78, 88. These data must have been previously fetched by the control logic from the bulk memory crate 56, and 58 and loaded into the second data buffers 73, 83 through the read multiplexers 76, 86.

This control logic also generates memory addresses for the bulk memory crates 56 and 58. Referring to FIG. 5, during handshake operations, addresses are taken from the FASTBUS data space Internal Address register 122 through the address multiplexer 116 and into the memory address counter 123. During no-handshake write operations, the address corresponding to the beginning of a block is copied from register 122 into register 119 when the first data buffer 72 or 82 is being loaded, or from register 122 into register 120 when the second data buffer 73 or 83 is being loaded. After a complete no-handshake write operation has proceeded on the FASTBUS, the corresponding value is transferred from register 119 or 120 through the address multiplexer 116 and into the memory address counter 123. The counter 123 is then incremented as successive words are transferred from a data buffer 72, 73, 82, or 83 (FIG. 2A) to the bulk memory crates 56 and 58 (FIG. 2A) as described above.

At the initiation of a no-handshake read operation, the contents of register 122 are compared to that of register 120 via comparator 67 to determine if the read operation requests the data already previously fetched by the control logic into the second data buffers 73 or 83 (FIG. 2A) as described above. If so, the contents of the second data buffer 73 or 83 are immediately transferred to the FASTBUS data lines 92 as described previously. If not, register 122 is copied to register 120, and the filling of the second data buffer 73 or 83 proceeds immediately. Upon the conclusion of this process, the contents of the second data buffer 73 or 83 are transferred to the FASTBUS data lines 92 as described above. Regardless of whether or not the second data buffer 73 or 83 already contained the desired no-handshake read data block, upon conclusion of the transfer of second data buffer 73 or 83 contents to the FASTBUS data lines 92, a new filling operation of the second data buffer 73 or 83 is initiated. The final value of register 122 is copied to register 120 and the contents of register 122 are then copied via the multiplexer 116 to the memory address register 123. The register 123 is incremented as successive words are read from the bulk memory crate 56 or 58 into the second data buffer 73 or 83 as described previously.

For simplicity of illustration, the system of FIGS. 2A and 2B is shown as having only two bulk memory crates 56 and 58 coupled to the bus 14 through respective slave data transfer units. However, the exemplary embodiment of the inventions is provided with four bulk memory crates to allow up to 256 frames of X-ray image data at 512 by 512 pixels per frame and 8 bits per pixel to be acquired.

Additional frames may be acquired if some of the data in the bulk memory are moved to the computer 98 while the acquisition of image data is in progress. For example, 300 frames may be acquired if data corresponding to 44 frames (i.e., 11 megabytes) are moved to the computer 98. The 300 frames correspond to 10 seconds of operation at 30 frames per second. By way of example, X-ray image data may be representative of the human heart, which is constantly moving. Such data can be obtained at a rate of up to 30 frames per second. At this frame rate, it becomes possible to perform computerized image enhancement on the X-ray image data using known digital image subtraction and edge enhancement techniques. To this end, following the initial acquisition of image data and its storage in the bulk memory crates 56 and 58, and possibly additional corresponding bulk memory crates, the image data may be read out by a second master data transfer unit 18 and provided via the FASTBUS transfer system to the computer 98 as required for image enhancement processing.

The DR780 port of the computer 98 is connected to the control and data lines 14 of the FASTBUS by means of second master control logic 94 and buffer 96, respectively. During periods when data are not being written into the bulk memory crates 56 and 58 by the first master data transfer unit 12, the second master data transfer unit 18 may assert control of the bus 14 and operate to cause the slave data transfer units to read specified data blocks from the bulk memory crates 56 and 58 and transfer that data over the data lines 92 to the buffer 96. Subsequently, the contents of the buffer 96 are transferred over data lines 97 to the DR780 port 102 of the computer 98. The maximum data rate for the DR780 port 102 of the computer 98 is 8 megabytes per second. Therefore, the data transfer between the bulk memory 17 and the second master transfer unit 18 may be effectuated at a rate which is considerably lower than that of the data transfer between the first master transfer unit 12 and the bulk memory. This slower data rate permits the MS=1 FASTBUS transfer mode (block transfer with full handshake).

For the bulk memory read operation, the slave control logic 60 or 62 is controlled by the second master control logic 94 which causes data to be read from bulk memory crates 56 or 58 by multiplexer 76 or 86 into the buffer 73 or 83, respectively. Thereafter, data are read out of the buffer 73 or 83 onto the data lines 92 as 32 bit words using multiplexer 78 or 88, respectively. The hardware configuration also permits direct reading from the bulk memory crates 56 and 58 onto the data lines 92 if desired. However, such direct reading may slow the data transfer operation and also reduce the time available to the FASTBUS system for data acquisition.

The second master control logic 94 consists of five major portions. The first of these implement a number of control registers (not shown) which may be read and written by the DR-780 port 102 via its Control Interconnect 95. Implementation of these registers follows the protocol of the Control Interconnect 95 as described in the DR-780 User's Guide published by Digital Equipment Corporation (order no. EK-DR780-002). These registers include requested byte counts to be transferred between the DR-780 port 102 and the FASTBUS, primary and secondary addresses for such transfer, and additional control information.

Referring now to FIG. 2B, the second portion of the second master control logic 94 directs the transfer of data between the buffer 96 and the Data Interconnect 97. During FASTBUS read operations, data are transferred from the buffer 96 to the Data Interconnect 97 whenever such data are present in the buffer 96 and the DR-780 port 102 indicates an ability to accept such data. During FASTBUS write operations, data are requested from the DR-780 port 102 whenever space is available in the buffer 96, and data are transferred from the Data Interconnect 96 to the buffer 96 whenever such data are available on the Data Interconnect 97.

The third portion of the control logic directs the transfer of data between the data buffer 96 and the FASTBUS data lines 92. When a FASTBUS write operation is in progress, new data words are transferred from the buffer 96 to the FASTBUS data lines 92 whenever such data are available in the buffer. However, during FASTBUS read operations new data are transferred from the FASTBUS data lines 92 into the buffer 96 whenever space in the buffer 96 is available.

The fourth portion of the second master control logic 94 directs the transfer of data between the FASTBUS data lines 92 and certain control registers located in the control logic. This control logic implements certain registers defined by the aforementioned FASTBUS specification. These registers may be accessed as a FASTBUS slave by other masters of the FASTBUS, including the first master data transfer unit 12, the third master data transfer unit 15 when included, and the second master data transfer unit 18 when it is acting as FASTBUS master. The registers implemented include Control/Status Registers (CSR) 0, 3, and 100 through 10F inclusive (not shown), as well as the control space Internal Address register (not shown). The control logic is implemented in a fashion following the FASTBUS specification mentioned previously.

The fifth portion of the control logic directs the transfer of the contents of Control/Status Register 100 through 10F inclusive to the DR-780 port 102 via the Control Interconnect 95, in order to implement an interrupt of the program running in the VAX computer. The protocol used to effect this transfer is that of a "write device message" operation as described in the DR-780 User's Guide.

Figure 7:
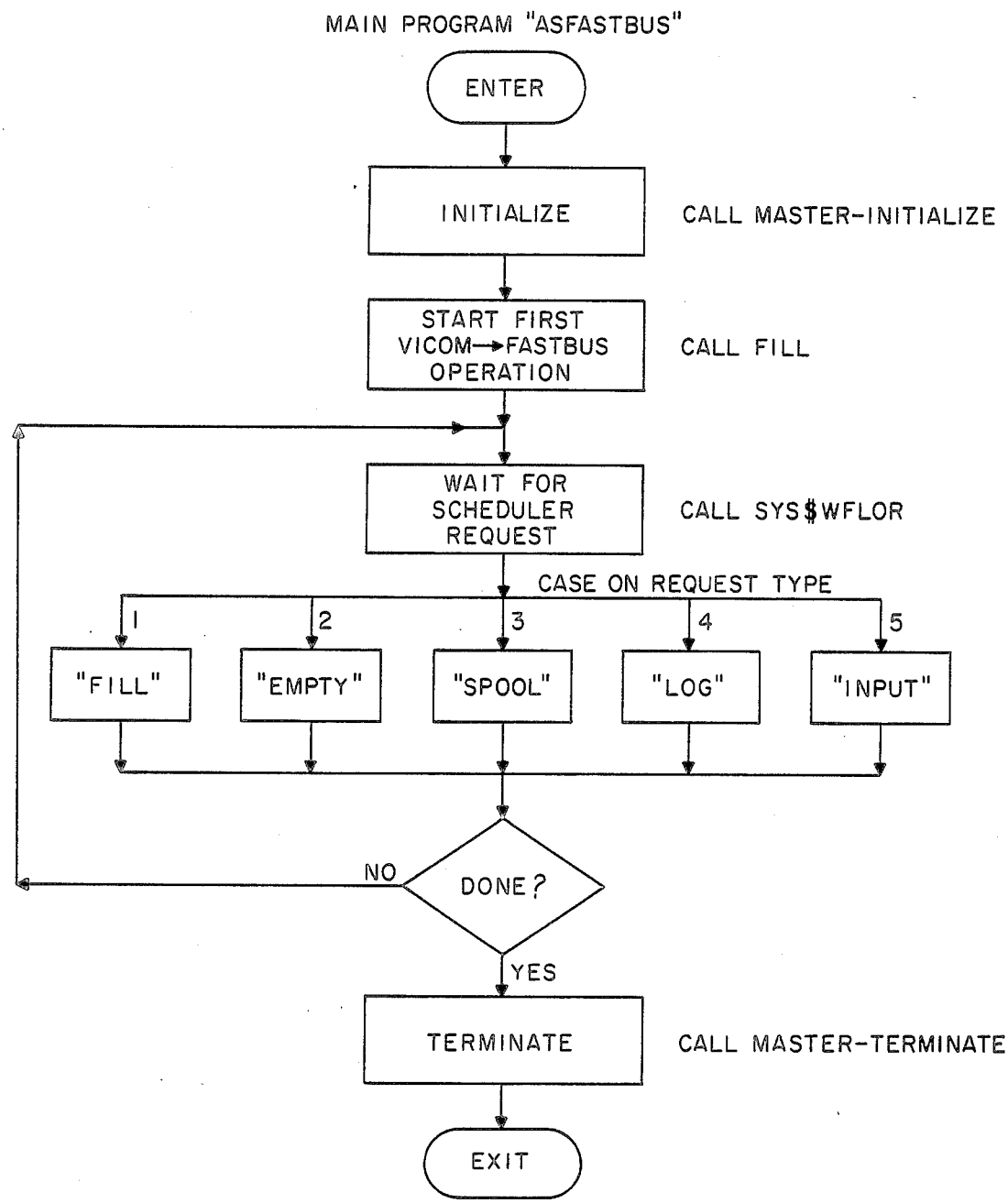
FIG. 7 is a flow diagram illustrating the ASFAST-BUS program of VAX 11/780 computer.
Figure 8:
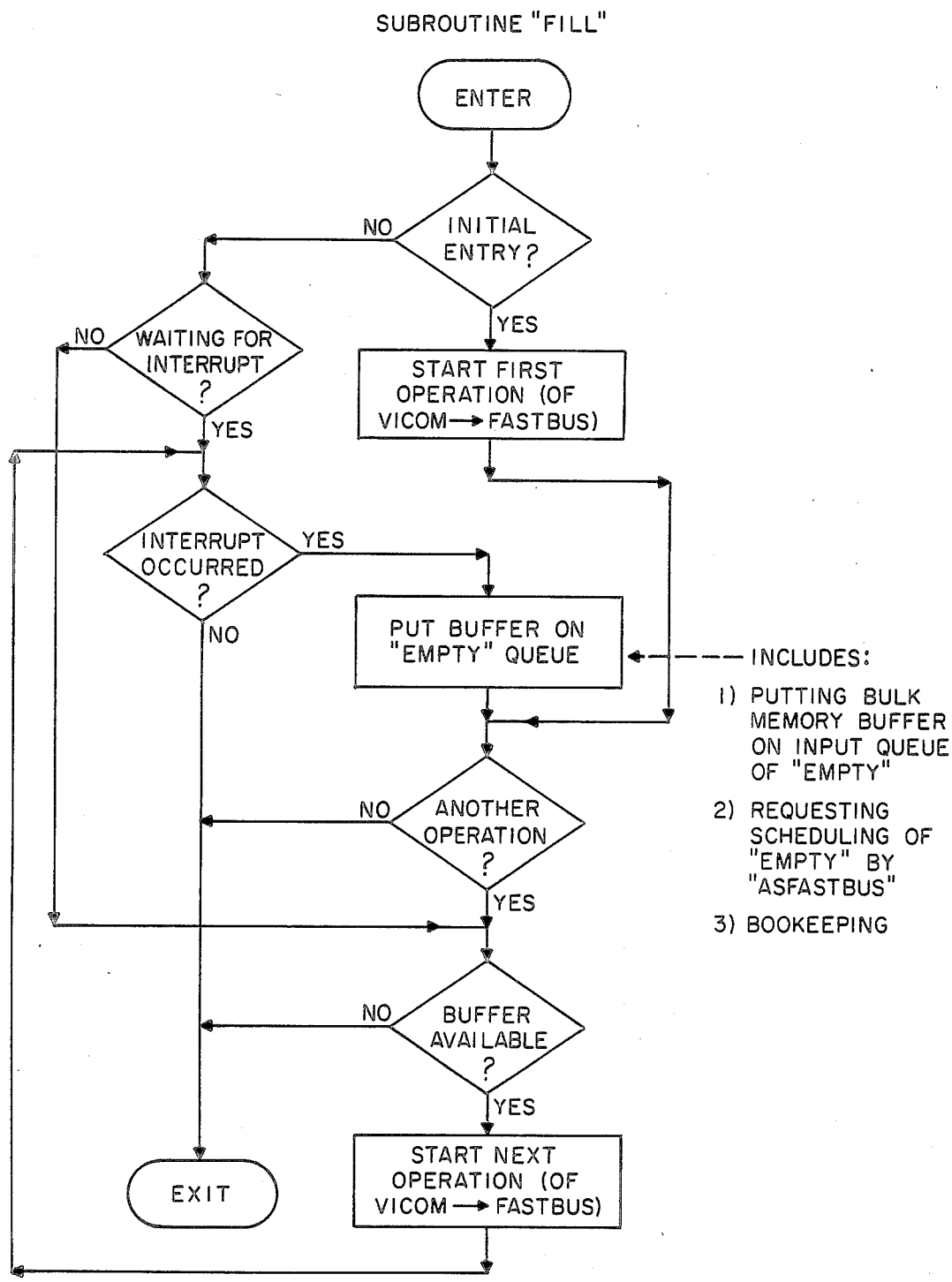
FIG. 8 is a flow diagram illustrating the FILL subroutine of the ASFASTBUS program.
Figure 9:
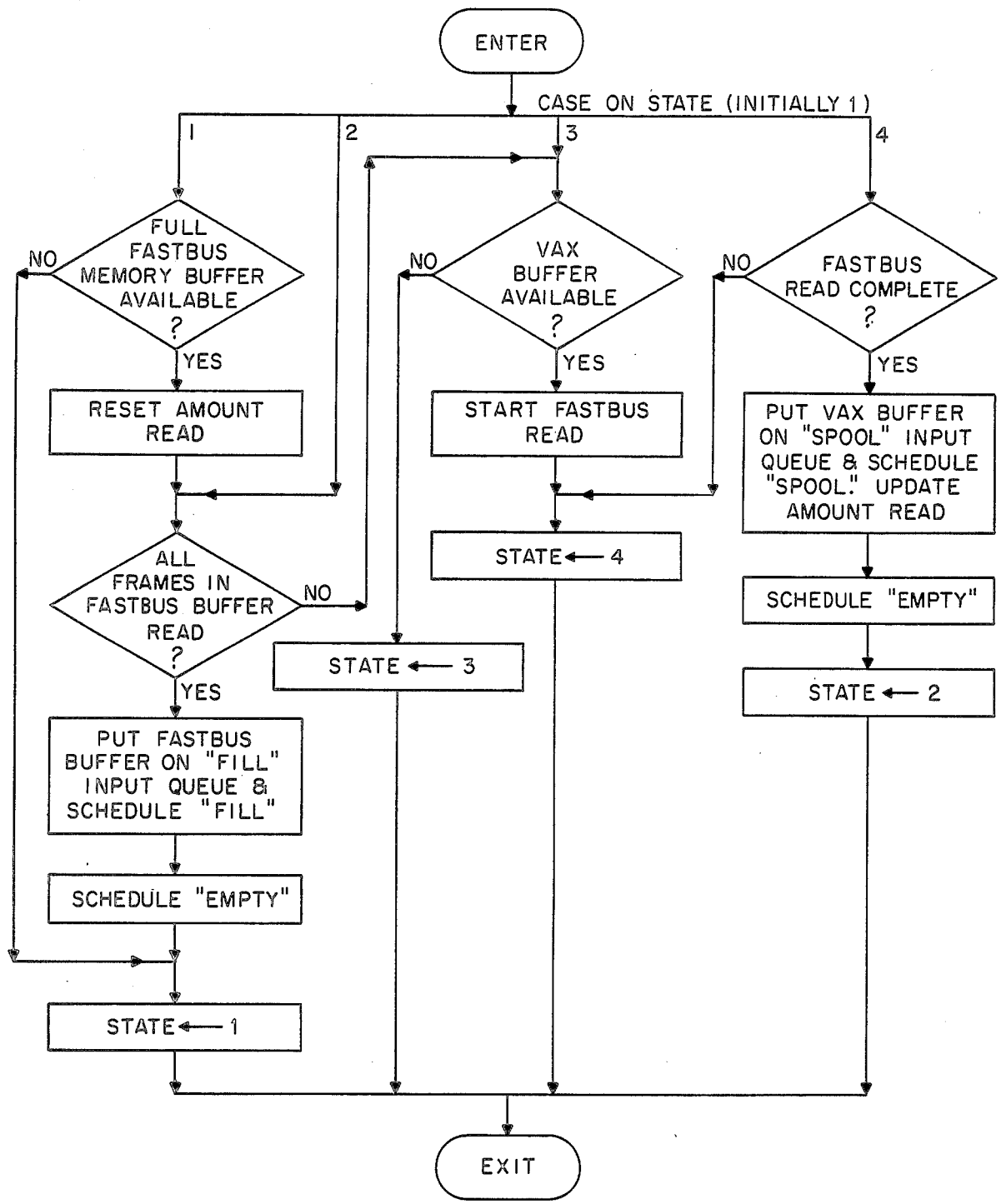
FIG. 9 is a flow diagram illustrating the EMPTY subroutine of the ASFASTBUS program.
Figure 10:
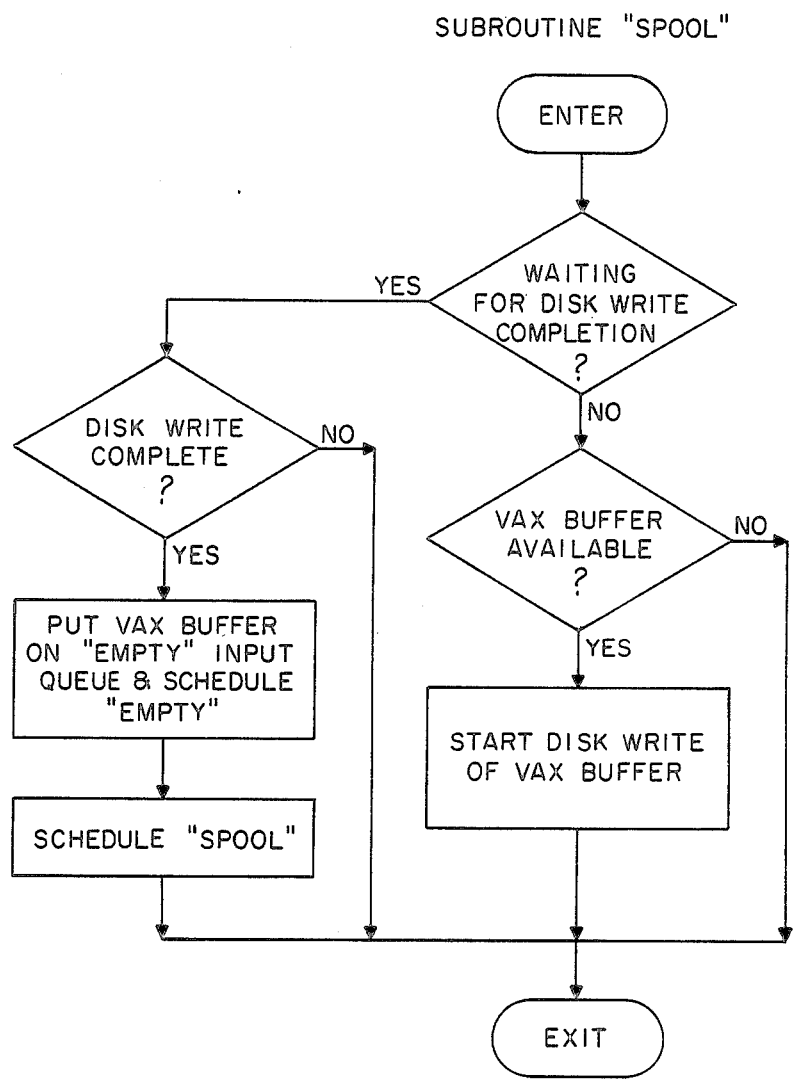
FIG. 10 is a flow diagram of the SPOOL subroutine of the ASFASTBUS program.
Figure 2A:
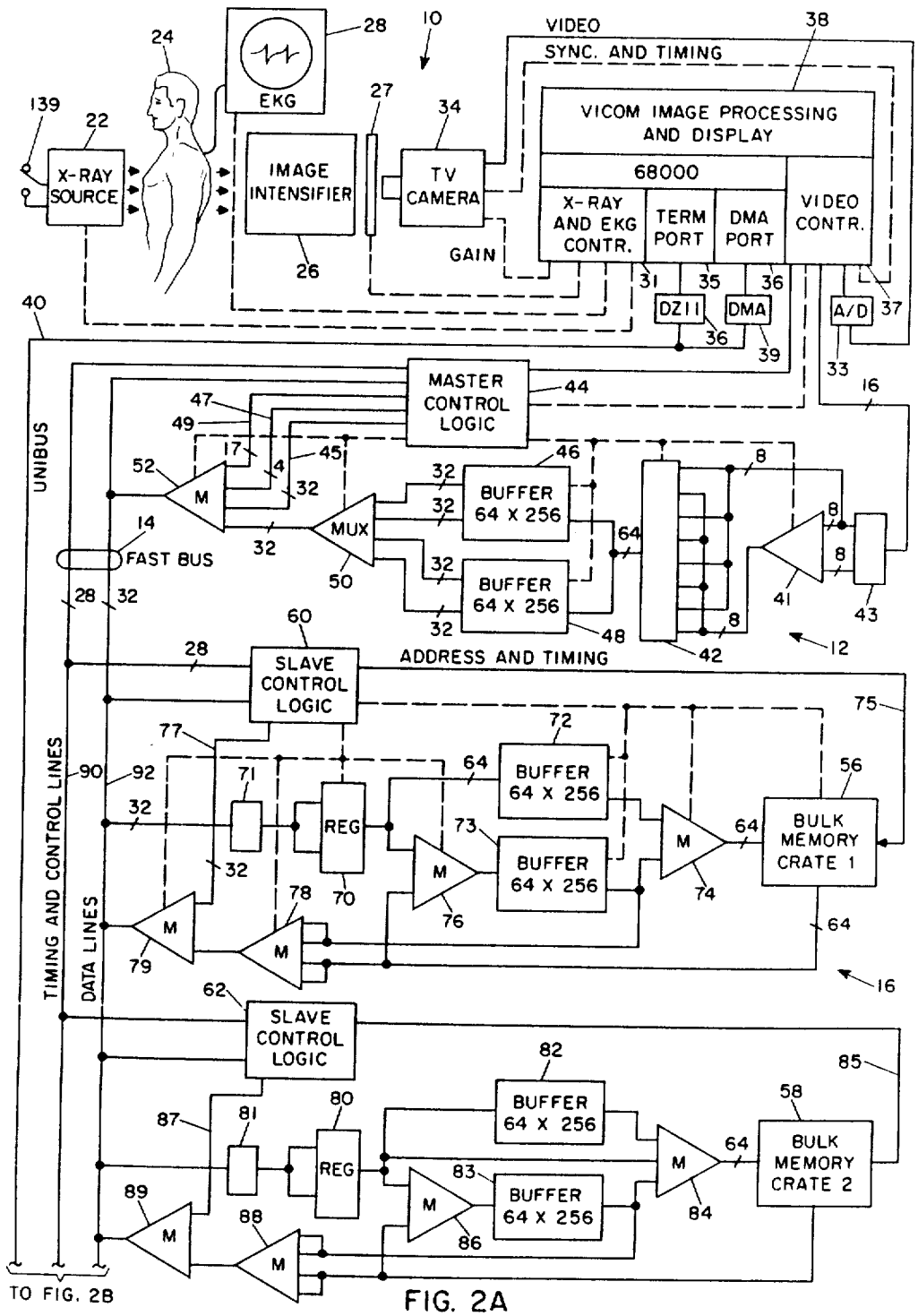
Figure 2B:
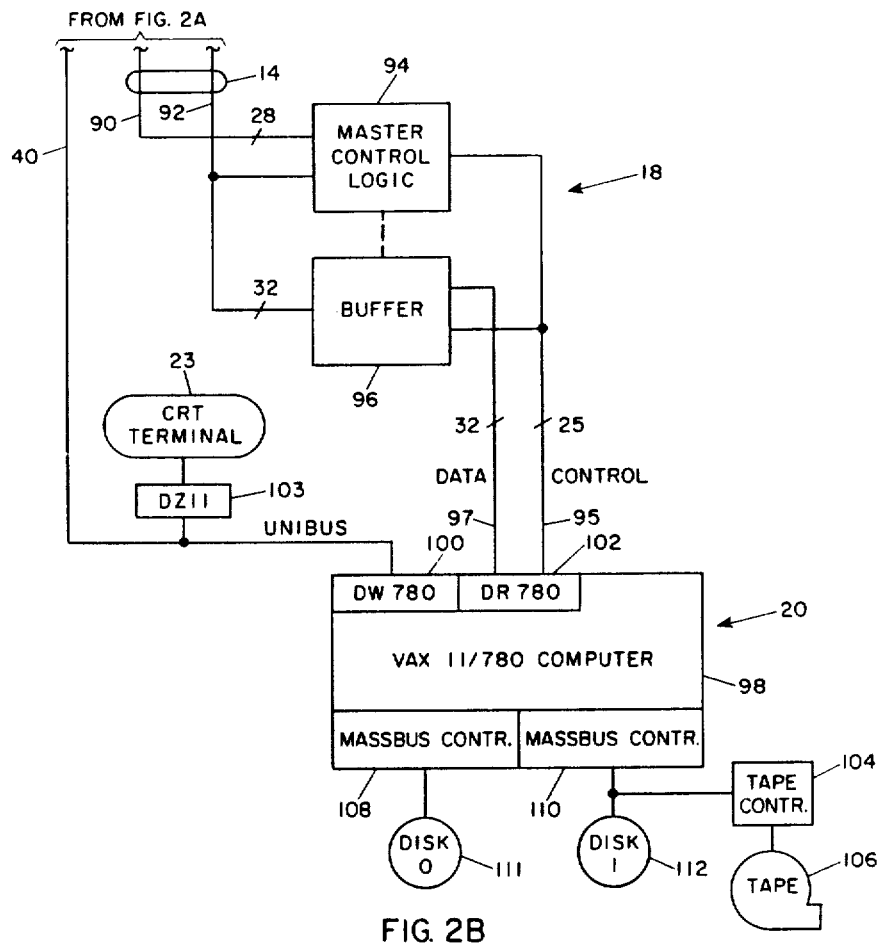
Figure 3:
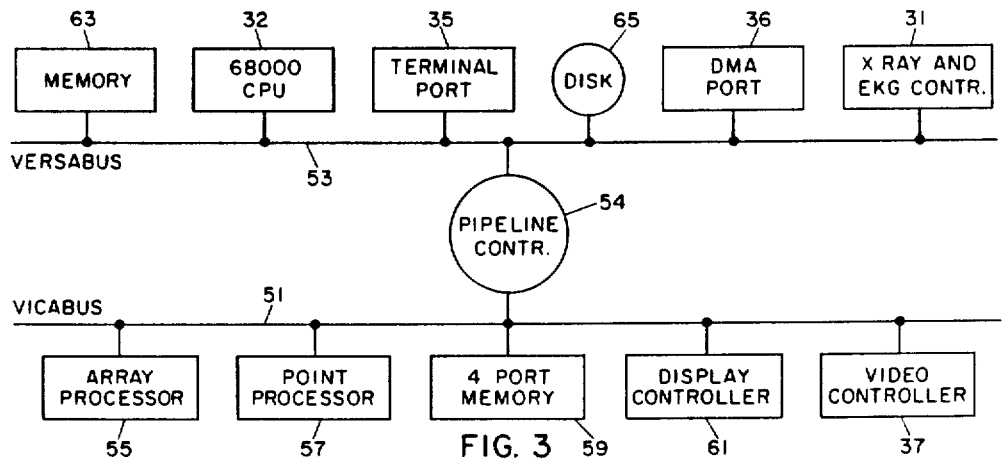
Figure 4:
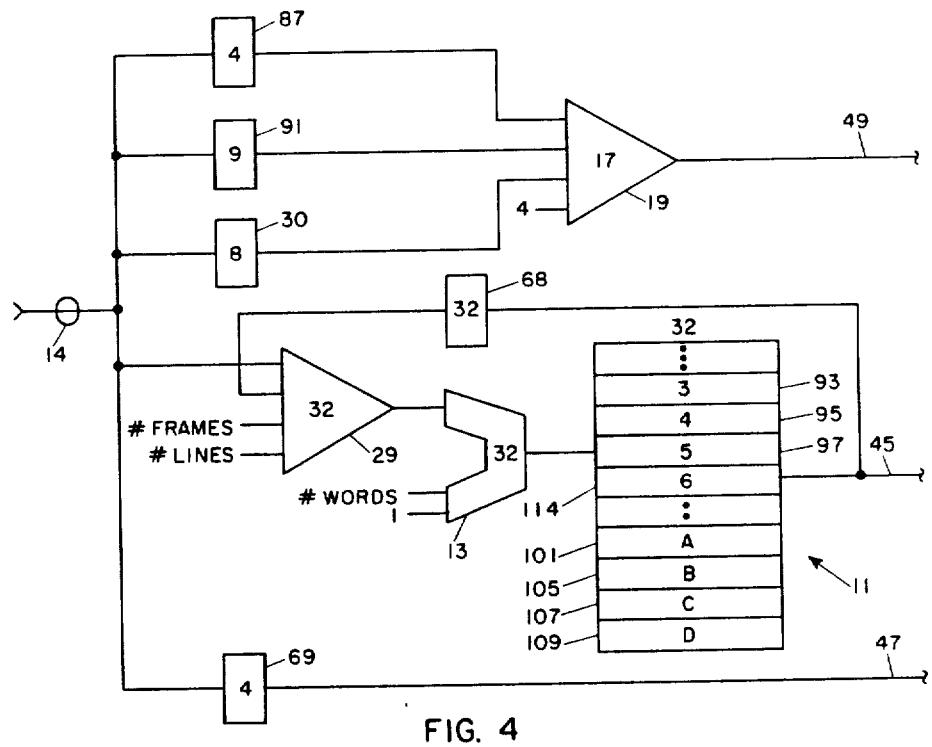
Figure 5:
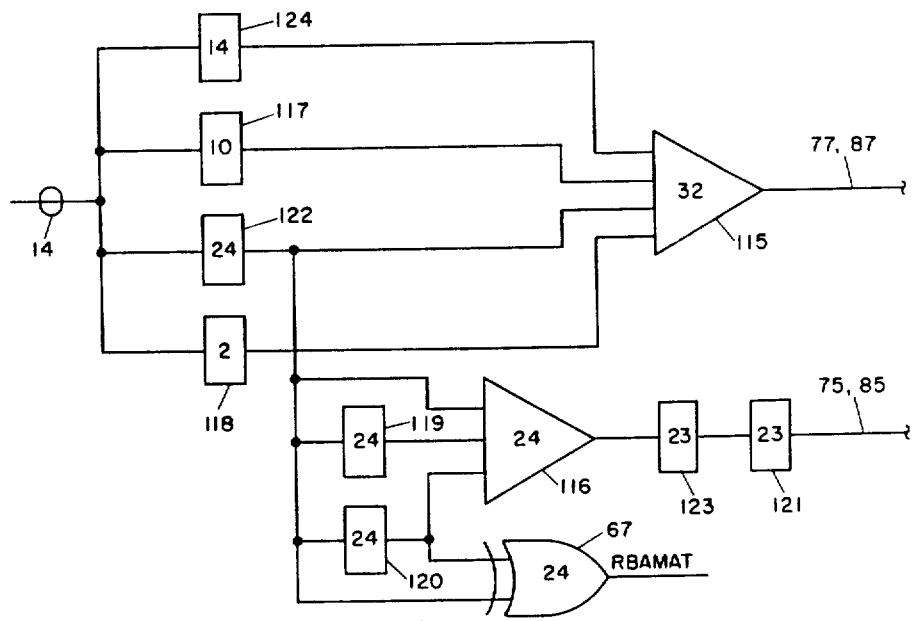

The program executed by the Computer 98 during image data acquisition is illustrated by the flow diagrams of FIGS. 7, 8, 9, and 10. The flow diagram of FIG. 7 represents the main program ASFASTBUS executed by the computer 98. The flow diagram of FIG. 8 represents a subroutine FILL, which may be called by the main program for transferring frames of image data from the VICOM 38 to the bulk memory 17. The flow diagram of FIG. 9 represents a subroutine EMPTY, which may be called by the main program for transferring the image data from the bulk memory 17 to the main memory of the computer 98. The flow diagram of FIG. 10 represents a subroutine SPOOL, which may be called by the main program for transferring the image data from the main memory of the computer 98 to the disk drives 111 and 112. Source code listings of ASFASTBUS and its subroutines FILL, EMPTY, and SPOOL are included in Appendix I.

After enhancement by the computer 98 as desired, the image data is stored on the disks 111 and 112. The stored image data can be used to reproduce the enhanced images on a television monitor (not shown) using conventional techniques.

Alternatively, the image data after enhancement by the computer 98 may be returned to the bulk memory crates 56 and 58 by means of the second master data transfer unit 18 and subsequently transferred to the VICOM by a third master data transfer unit 15 (FIG. 1) as required for viewing. For simplicity of illustration, the third master data transfer unit is not shown in FIGS. 2A and 2B. Where the FASTBUS system is provided with the third master data transfer unit 15, each slave data transfer unit also responds to the address and control signals from the third master data transfer unit.

Figure 6:
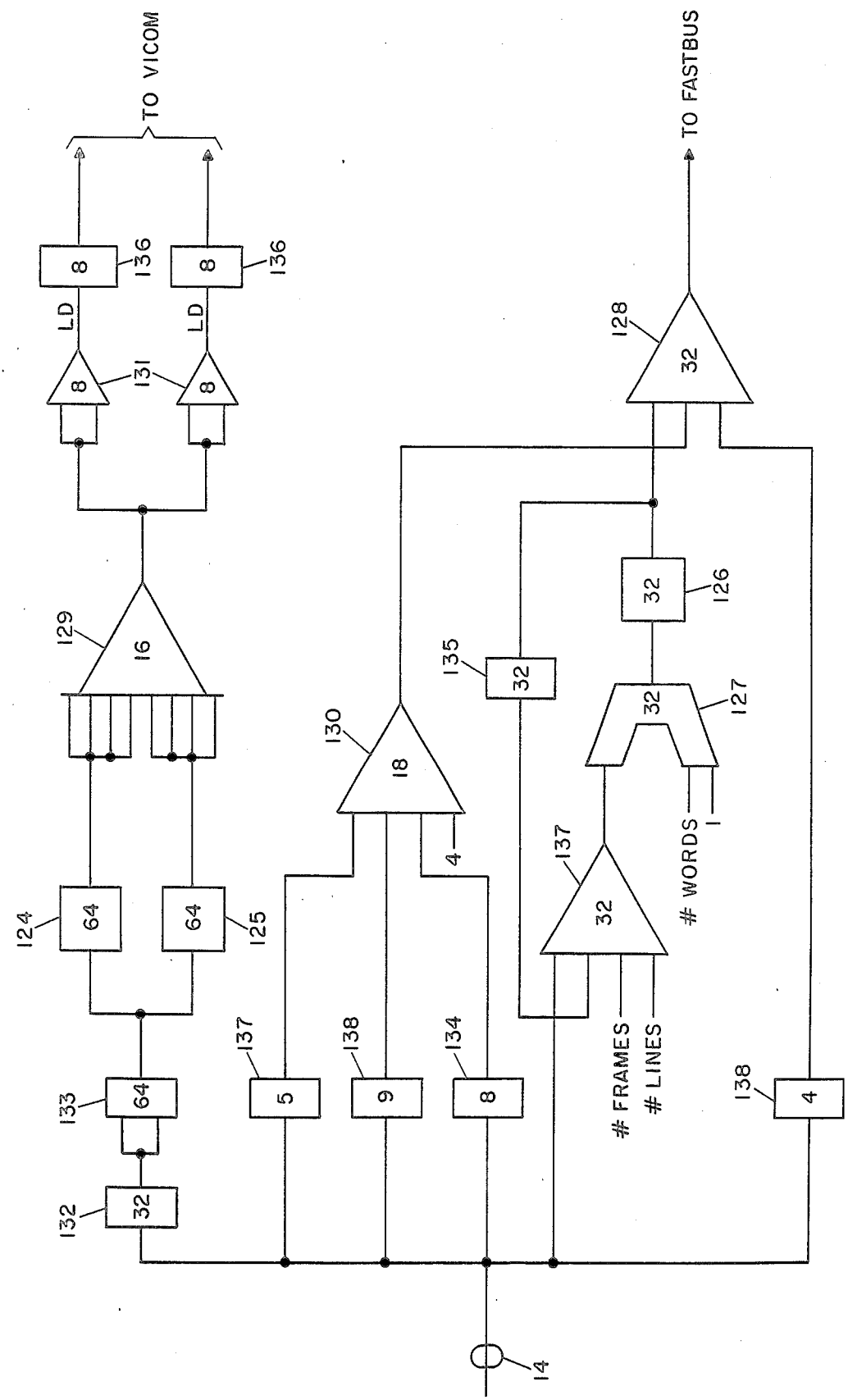
FIG. 6 is a schematic diagram illustrating the data paths of the third (FASTBUS to VICOM) master data transfer unit.

The data paths of the third master data transfer unit are illustrated in FIG. 6, in which the number above each element represents the width of the element in bits. Referring to FIG. 6, the data paths of the third master data transfer unit 15 include 256 location line buffers 124 and 125; a 16 location 32 bit wide scratch pad register memory 126; a 32 function arithmetic logic unit (ALU) 127 with carry look-ahead; multiplexers 128, 129, 130, 137 and 131; data latches 132, 133, 134, 135 and 136; and flip-flops 137 and 138.

The control logic of the third master data transfer unit 15 is composed of four distinct portions, which control access to the various internal registers (not shown) during operation as FASTBUS slave, filling of the double data buffers during operation as a FASTBUS master, general operation as FASTBUS master, and the emptying of the double data buffers to the VICOM video controller. The first and third of these are clocked by a crystal oscillator within the control logic. For instance, a 40 megahertz clock oscillator may be used for reasonable logic execution speed. The second of these is clocked by an oscillator within the control logic whose frequency is greater than 5/2 the frequency of the clock in the slave control logic 60 and 62. For example, if the slave control logic 60 and 62 utilize 40 megahertz oscillators for the bulk memory data transfer, a 105 megahertz oscillator may be used for the double buffer control logic in the third master, since 105 megahertz is greater than 5/2 or 40 megahertz. The clock for the fourth portion of the control logic is provided by the VICOM video controller.

The control logic for accessing internal registers is effectively identical to the corresponding logic in the first master control logic 44. This control logic controls registers 134, 137 and 138, registers 3, 4, 5, A and B (not shown in FIG. 6; however, the organization of the scratch pad 126 is similar to that scratch pad 11 in FIG. 4) in the scratch pad memory 126, plus a control space Internal Address register 138.

The control logic for filling the double data buffers is essentially identical to the double data buffer control logic in the slave control logic 60 and 62. Here register 132 corresponds to the register 71, 81 (see FIG. 2A) in the slave control logic, while the 64 bit assembly register 133 in the third master corresponds to assembly register 70, 80 (see FIG. 2A) in the slave control logic. The double buffer control logic in the third master is triggered by logic level transitions on the FASTBUS DK strobe in slave control logic for loading the double buffer.

The control logic for general operations as FASTBUS master is similar to the buffer emptying control logic in the first master logic 44. The sole difference is that after acquiring the FASTBUS and transmitting an address prologue, the third master enables the operation of the double buffer control logic to fill a double buffer from the FASTBUS data lines 92, while in the first master control logic 44 one of the double buffers is emptied to the FASTBUS data lines 92. In particular, the control logic in the third master may maintain temporary storage registers in the scratch pad 126 containing the number of frames remaining to be displayed, the number of scan lines remaining in the current frame, and the current location (logical address) in bulk memory from which the next scan line is to be fetched. The control logic may also generate a FASTBUS interrupt in a similar fashion to that described with the first master control logic 44 previously.

The buffer emptying control logic generates address for the double buffer currently being emptied to the VICOM video controller 37 (FIG. 2A), and controls multiplexer 129. Double buffer addresses are generated separately for both 32 bit halves of a buffer. When both 16 bit portions of a 32 bit half of a buffer have been sent to the VICOM, the address of that half of the buffer is advanced while the two 16 bit portions of the other 32 bit half of the buffer are furnished to the VICOM. When 16 bit pixel values are being furnished to the VICOM video controller, the multiplexer 131 in the upper half of the 16-bit LD word is always set to select the upper 8 bits furnished by the multiplexer 129, while the gate in the lower half to the 16-bit LD word is enabled, thus furnishing the lower 8 bits from the multiplexer 129 as the lower half of the LD word. When 8 bit pixel values are furnished to the VICOM video controller 37 (FIG. 2A), the multiplexer 131 in the upper half of the 16-bit LD word alternately selects the low and high halves of the 16 bit word furnished by the multiplexer 129, while the gate in the lower half of the 16-bit LD word is disabled, thus furnishing zero data in this half of the LD word. The buffer emptying control logic again verifies that the VICOM video controller 37 (FIG. 2A) requests the correct number of pixels per scan line, and the correct number of scan lines per image frame.

The system shown in FIGS. 2A and 2B is operated by providing appropriate commands to the computer 98 by entering the type of operation which is desired on the CRT terminal 23 coupled to the computer 98. In the previously mentioned EKG gated mode, the operation of the X-ray source, image intensifier and TV camera are correlated to the EKG signals of the patient being examined to provide images which are taken at points in time when the heart motion is at a minimum (i.e., systole and diastole). This method of X-ray examination is particularly helpful for examining the heart function of patients having congenital heart diseases, and also for examining the heart functions of infants having heart diseases or malformations.

The previously mentioned fixed time interval mode of operation provides for continuous high speed frame exposure following an intravenous injection of a contrast medium while correlating each exposure to the EKG signals of the patient. This second mode of operation is most useful for examining the blood flow through the heart arteries, particularly in cases of myocardial infarction.

The invention thus provides a novel and highly effective data acquisition system that enables image representing data at high frame rates to be subjected to digital image enhancement techniques in computer apparatus whose maximum rate for the reception of data is far below the rate at which the image representing data are being generated.

The specific embodiments described herein are merely illustrative and are susceptible to modification in form and detail within the scope of the following claims. For example, the image data acquisition and processing techniques disclosed herein may be applied to X-ray imaging of the anatomical vasculature of regions of the patient's body other than the heart.

We claim:

1. A method for obtaining images of anatomical vasculature of a living patient comprising the steps of:
    intravenously injecting a suitable contrast medium into the body of the patient;
    directing a beam of X-rays through a region of the patient's body;
    deriving video images of the vasculature of the region of the patient's body from the X-rays transmitted through the region at a rate sufficient to avoid significant blurring of the video images caused by the motion of tissue and bone in the region;
    generating digital image data corresponding to the video images at substantially the rate at which the video images are derived;
    storing the digital image data in a bulk memory, including transferring the digital image data over a bus to the bulk memory at least at the rate at which the digital image data are generated, said transferring to the bulk memory including:
        assembling the digital image data into first data blocks of a first predetermined size;
        providing first block transfer control signals under a predetermined block transfer protocol;
        generating first data transfer words from the first data blocks in response to the first control signals;
        receiving the first data transfer words in response to the first control signals; and
        deriving the digital image data from the first data transfer words and storing the digital image data in the bulk memory; and
    processing the digital image data to enhance the video images for subsequent viewing, including transferring the digital image as required for such processing from the bulk memory over the bus when the bus is not being used for transferring digital image data to the bulk memory, said transferring from the bulk memory including:
        generating second block transfer control signals under the predetermined block transfer protocol;
        reading the digital image data from the bulk memory in response to the second block transfer control signals;
        assembling the digital image data into second data blocks having a second predetermined size;
        generating second data transfer words from the second data blocks in response to the second block transfer control signals;
        receiving the second data transfer words in response to the second control signals; and
        deriving the digital image data from the second data transfer words.

2. The method according to claim 1 wherein the step of deriving video images of the patient's anatomical vasculature includes deriving video images prior to injecting the contrast medium and deriving corresponding video images after injecting the contrast medium, and the step of processing the digital data includes comparing the digital image data corresponding to video images derived prior to injecting the contrast medium with that corresponding to video images derived after injecting the contrast medium.

3. The method according to claim 1 wherein the step of processing the digital image data includes processing the digital data with a computer and the rate of transferring the digital image data from the bulk memory for processing is commensurate with the capability of the computer to receive data.

4. The method according to claim 3 wherein the region of the patient's body includes the patient's heart, further comprising the step of generating EKG signals corresponding to the patient's heartbeat, and the video images of the patient's heart are correlated with the EKG signals.

5. The method according to claim 3 further comprising the step of storing processed digital image data in the bulk memory, including transferring the processed digital image data from the computer over the bus to the bulk memory when the bus is not being used for transferring digital image data to the bulk memory or for transferring digital image data from the bulk memory for processing, and wherein the step of transferring processed digital image data over the bus to the bulk memory for storage includes:

assembling the digital image data into third data blocks of a third predetermined size;

providing third block transfer control signals under the predetermined block transfer protocol;

generating third data transfer words from the third data blocks in response to the third control signals;

receiving the third data transfer words in response to the third control signals; and deriving the processed digital image data from the third data transfer words and storing the processed digital image data in the bulk memory.

6. The method according to claim 5 further comprising the step of transferring the processed digital image data from the bulk memory over the bus for viewing when the bus is not being used for transferring digital image data to the bulk memory, for transferring digital image data for processing or for transferring processed digitial image data to the bulk memory for storage, wherein the step of transferring processed digital image data from the bulk memory for viewing includes:

providing fourth block transfer control signals under the predetermined block transfer protocol;

reading the processed digital image data from the bulk memory in response to the fourth block transfer control signals;

assembling the processed digital image data into fourth data blocks having a fourth predetermined size;

generating fourth transfer words from the fourth data blocks in response to the fourth transfer control signals;

receiving the fourth data transfer words in response to the fourth control signals; and deriving the processed digital image data from the fourth data transfer words.

7. Image data acquisition and processing apparatus comprising:

video camera means providing video signals corresponding to multiple images derived at a relatively rapid rate;

analog-to-digital conversion means responsive to the video signals for providing digital image data corresponding to the images;

a data transfer bus having multiple data lines and control lines;

first and second control means providing first and second control signals, respectively;

first master data transfer means operatively coupled to the data transfer bus and responsive to the first control signals for assembling the image data into data blocks having predetermined block size and format and for controlling the data transfer bus to supply the image data to the data lines in a block transfer operation and to supply first control data to the control lines;

second master data transfer means operatively coupled to the data transfer bus and responsive to the second control signals for controlling the data transfer bus to supply second control data to the control lines and to receive image data from the data lines, wherein only one of the first and second master data transfer means controls the data transfer bus at one time and the first master data transfer means having priority over the second for such control;

bulk memory means for storing the image data;

slave data transfer means operatively coupled to the data transfer bus, responsive to the first control data for receiving the image data on the data lines and for transferring the received image data to the bulk memory means, and responsive to the second control data for fetching specified image data from the bulk memory means and supplying the fetched image data to the data lines; and data processing means operatively coupled to the second master data transfer means for receiving image data therefrom and for processing the received image data to enhance the images corresponding thereto for subsequent viewing, wherein the second control means is responsive to the data processing means for providing the second control signals.

8. Image data acquisition and processing apparatus according to claim 7 wherein the data processing means includes an appropriately programmed digital computer.

9. Image data acquisition and processing apparatus according to claim 7 wherein the first master data transfer means includes first buffer means for assembling the data blocks and first control logic means for controlling the operation of the buffer means and for supplying the first control data.

10. Image data acquisition and processing apparatus according to claim 7 wherein the first master data transfer means includes means for generating address signals to select the slave data transfer means for an operation specified by the first control data and means for supplying the address signals to the data lines, and the slave data transfer means includes means responsive to the address signals on data lines for causing the slave data transfer means to respond to the first control data or the control lines.

11. Image data acquisition and processing apparatus according to claim 10 wherein the first master data transfer means is arranged to supply the address signals on the data lines prior to each block transfer operation, and the slave data transfer means is responsive to the address signals on the data lines for accessing the bulk memory means.

12. Image data acquisition and processing apparatus according to claim 7 wherein the slave data transfer means includes second buffer means and second control logic means responsive to the first control data on the control lines for causing the second buffer means to receive and store data blocks from the data lines and the transfer of data from the second buffer means to the bulk memory, the second control logic means being responsive to the second control data on the control lines for fetching the specified image data from the bulk memory, for storing the fetched image data as data blocks in the second buffer means and for supplying the image data in the second buffer means to the data lines in a block transfer operation.

13. Image data acquisition and processing apparatus according to claim 7 further comprising third control means for providing third and fourth control signals to the video camera means and the analog-to-digital conversion means, respectively, to coordinate the operation of the first master data transfer means with that of the video camera means and the analog-to-digital conversion means.

14. Image data acquisition and processing apparatus according to claim 13 wherein the first control means also provides fifth control signals and the second control means is responsive to the data processing means for providing sixth control signals; the second master data transfer means is responsive to the sixth control signals for receiving processed image data from the data processing means, for assembling the processed image data into data blocks of specified block size and for controlling the data transfer bus to supply processed image data to the data lines in a block transfer operation and to supply third control data to the control lines; the slave data transfer means is responsive to the third control data for receiving the processed image data on the data lines and for transferring the received image data to the bulk memory; the apparatus further comprises display means and third master data transfer means operatively coupled to the data transfer bus and responsive to the fifth control signals for controlling the data transfer bus to supply fourth control data to the control lines and to receive processed image data from the data lines and for providing the received processed image data to the display means, only one of the first, second and third master data transfer means controls the data transfer bus at one time and the first and second master data transfer means having priority over the third for such control; and the slave data transfer means is responsive to the fourth control data for fetching specified processed image data from the bulk memory means and supplying the fetched processed image data to the data line.

15. The method according to claim 1 further comprising the step of storing said processed digital image data in a mass storage device.

16. The method according to claim 15 wherein said mass storage device forms part of a computer.

17. The method according to claim 16 wherein the step of processing the digital image data includes processing the digital data with said computer and includes storing the digital data in said computer for subsequent use to reproduce the enhanced video images on a television monitor.

* * * * *

UNITED STATES PATENT AND TRADEMARK OFFICE
CERTIFICATE OF CORRECTION

PATENT NO. : 4,709,332

DATED : November 24, 1987

INVENTOR(S) : John Morrison et al.

It is certified that error appears in the above-identified patent and that said Letters Patent is hereby corrected as shown below:

Col. 10, line 60, after "pixel" insert --by pixel--;
Col. 11, line 53, "now" should read --not--;
Col. 12, lines 34-35, "synchronication" should read --synchronization--;
Col. 14, line 39, "sytem" should read --system--;
Col. 21, line 1, "to" should read --of--;
Col. 22, line 17, after "image" insert --data--.

The sheets of Drawings consisting of Figures 2A, 2B, 3, 4 and 5 should be deleted to appear as per attached sheets.

Signed and Sealed this

Twenty-third Day of August, 1988

Attest:

DONALD J. QUIGG

Attesting Officer

Commissioner of Patents and Trademarks